United States Patent
Aptus et al.

(10) Patent No.: US 7,114,149 B2
(45) Date of Patent: Sep. 26, 2006

(54) NAVIGATION LINKS IN GENERATED DOCUMENTATION

(75) Inventors: Alexander Aptus, Esslingen (DE); Dietrich Charisius, Stuttgart (DE)

(73) Assignee: Borland Software Corporation, Cupertino, CA (US)

(*) Notice: Subject to any disclaimer, the term of this patent is extended or adjusted under 35 U.S.C. 154(b) by 731 days.

(21) Appl. No.: 09/838,578

(22) Filed: Apr. 20, 2001

(65) Prior Publication Data

US 2002/0029231 A1 Mar. 7, 2002

Related U.S. Application Data

(63) Continuation-in-part of application No. 09/680,063, filed on Oct. 4, 2000.

(60) Provisional application No. 60/199,046, filed on Apr. 21, 2000, provisional application No. 60/157,826, filed on Oct. 5, 1999.

(51) Int. Cl.
*G06F 9/44* (2006.01)

(52) U.S. Cl. ............ 717/123; 717/101; 717/122; 715/513; 715/515

(58) Field of Classification Search ........ 717/101–123; 715/513–516, 522; 382/240
See application file for complete search history.

(56) References Cited

U.S. PATENT DOCUMENTS

| | | | |
|---|---|---|---|
| 4,488,258 A | 12/1984 | Struger et al. | |
| 5,526,520 A | 6/1996 | Krause | |
| 5,530,942 A | 6/1996 | Tzou et al. | |
| 5,592,600 A | 1/1997 | De Pauw et al. | |
| 5,813,019 A | 9/1998 | Van De Vanter | |
| 5,818,711 A | 10/1998 | Schwabe et al. | |
| 5,841,959 A | 11/1998 | Guiremand | |
| 5,905,508 A | 5/1999 | Beitel | |
| 5,940,615 A | 8/1999 | Novick et al. | |
| 6,580,823 B1* | 6/2003 | Englefield et al. | 382/162 |
| 6,643,824 B1* | 11/2003 | Bates et al. | 715/501.1 |
| 6,711,299 B1* | 3/2004 | Chao et al. | 382/240 |

FOREIGN PATENT DOCUMENTS

| | | |
|---|---|---|
| EP | 0 913 779 A2 | 5/1999 |
| WO | WO 0036528 | 6/2000 |

OTHER PUBLICATIONS

By Suzuki et al., "Managing the software design documents with XML", Proceedings of the 16th annual international conference on Computer documentation, Sep. 1998.*

Petry, "Getting the Most out of Legacy Code—The uses of HyperCode within a typical IS organization", IEEE, pp.: 852-857, 1996.*

Rational Software White Paper, "Mapping Object to Data Models with the UML", Rational—the e-development company, pp.: i-iii, 1-10, Mar. 2000.*

Anonymous, "Link-Driven Annotation of HTML Pages", Research Disclosure, Jun. 1999, p. 893.

* cited by examiner

*Primary Examiner*—Ted T. Vo
(74) *Attorney, Agent, or Firm*—MacCord Mason PLLC

(57) ABSTRACT

Methods and systems consistent with the present invention provide an improved software development tool that generates HTML documentation for source code in a software project. The HTML documentation includes graphical and textual documentation. The software development tool utilizes the linking capabilities of HTML to provide navigation links between the graphical and textual documentation, thus facilitating navigation through and viewing of the documentation.

16 Claims, 26 Drawing Sheets

2302

```
/**
 * This is a sample class to allow exploration of various features of Together's run-time environment.
 * @author Together Developer
 * @version 1.0
 * @see MyThread
 */
public class Hello {
    /**
     * This is the main routine to run this example.
     */
    static void main (String[] args) {
        char chr = '\n';
        long lng = 0x9abcL;
        double dbl = 123.45;
        int zero = 0;
        String str = "Hello, Hello...";
        new MyThread("MyThread1").start();
        new MyThread("MyThread2").start();
        System.out.println(str);
    } private int attribute1;
}
```

FIG. 24

Class Hello public class Hello

This is a sample class to allow exploration of various features of Together's run-time environment.

Author:
    Together Developer
Version: 1 0
See Also: MyThread

Method Summary

| (package private) static void | main(String[] args) This is the main routine to run this example |
|---|---|

Method Detail main static void main(String[] args)

This is the main routine to run this example.

FIG. 25

NAVIGATION LINKS IN GENERATED DOCUMENTATION

CROSS-REFERENCE TO RELATED APPLICATIONS

This application claims the benefit of the filing date of U.S. Provisional Application No. 60/199,046, entitled "Software Development Tool," filed on Apr. 21, 2000, and is a continuation-in-part of U.S. patent application Ser. No. 09/680,063, entitled "Method and System for Developing Software," filed on Oct. 4, 2000, which claims the benefit of the filing date of U.S. Provisional Application No. 60/157,826, entitled "Visual Unified Modeling Language Development Tool," filed on Oct. 5, 1999, and U.S. Provisional Application No. 60/199,046, entitled "Software Development Tool," filed on Apr. 21, 2000; all of which are incorporated herein by reference.

The following identified U.S. patent applications are also relied upon and are incorporated by reference in this application:

U.S. patent application Ser. No. 09/680,065, entitled "Method And System For Displaying Changes Of Source Code," filed on Oct. 4, 2000;

U.S. patent application Ser. No. 09/680,030, entitled "Method And System For Generating, Applying, And Defining A Pattern," filed on Oct. 4, 2000;

U.S. patent application Ser. No. 09/680,064, entitled "Method And System For Collapsing A Graphical Representation Of Related Elements," filed on Oct. 4, 2000;

U.S. patent application Ser. No. 09/680,064, entitled "Methods and Systems for Generating Source Code for Object Oriented Elements," and filed on the same date herewith;

U.S. patent application Ser. No. 09/839,526, entitled "Methods and Systems for Relating Data Structures and Object Oriented Elements for Distributed Computing," and filed on the same date herewith;

U.S. patent application Ser. No. 09/839,525, entitled "Methods and Systems for Finding Specific Line Of Source Code," and filed on the same date herewith;

U.S. patent application Ser. No. 09/839,525, entitled "Methods and Systems for Finding and Displaying Linked Objects," and filed on the same date herewith;

U.S. patent application Ser. No. 09/839,527, entitled "Methods and Systems for Animating the Interaction of Objects in an Object Oriented Program," and filed on the same date herewith;

U.S. patent application Ser. No. 09/839,646, entitled "Methods and Systems for Supporting and Deploying Distributed Computing Components," and filed on the same date herewith;

U.S. patent application Ser. No. 09/838,580, entitled "Diagrammatic Control of Software in a Version Control System," and filed on the same date herewith;

U.S. patent application Ser, No. 09/839,644, entitled "Methods and Systems for Identifying Dependencies Between Object Oriented Elements," and filed on the same date herewith; and U.S. patent application Ser. No. 09/839,524, entitled "Methods and Systems for Relating a Data Definition File and a Data Model for Distributed Computing," and filed on the same date herewith.

FIELD OF THE INVENTION

The present invention relates to a method and system for developing software. More particularly, the invention relates to a method and system for generating software documentation having navigation links between diagram portions and textual portions of the documentation.

BACKGROUND OF THE INVENTION

Computer instructions are written in source code. Although a skilled programmer can understand source code to determine what the code is designed to accomplish, with highly complex software systems, a graphical representation or model of the source code is helpful to organize and visualize the structure and components of the system. Using models, the complex systems are easily identified, and the structural and behavioral patterns can be visualized and documented.

The well-known Unified Modeling Language (UML) is a general-purpose notational language for visualizing, specifying, constructing, and documenting complex software systems. UML is used to model systems ranging from business information systems to Web-based distributed systems, to real-time embedded systems. UML formalizes the notion that real-world objects are best modeled as self-contained entities that contain both data and functionality. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML: Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file which, when compiled, forms a sequence of instructions to be run by the data processing system. The repository 108 generates the UML 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the portion of source code 104 that is not protected from being overwritten is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side-effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. There is a need in the art for a tool that avoids the limitations of these conventional software development tools.

SUMMARY OF THE INVENTION

Methods and systems consistent with the present invention provide an improved software development tool which overcomes the limitations of conventional software development tools. The improved software development tool of the present invention allows a developer to simultaneously view a graphical and a textual display of source code. The graphical and textual views are synchronized so that a modification in one view is automatically reflected in the other view. The software development tool is designed for use with more than one programming language.

The software development tool generates documentation for source code in a software project. The documentation includes a diagrammatic and a textual portion. The software development tool generates links between the diagrammatic and the textual portions of the documentation to facilitate navigation through and viewing of the documentation. The diagrammatic portion comprises images that form an interaction diagram that visually represent the source code in the software project. The textual portion comprises a text-based description of the classes and class members in the source code.

In accordance with methods consistent with the present invention, a method for generating documentation for source code is provided. The method comprises the steps of generating textual documentation that describes the source code, the textual documentation having portions that correspond to portions of the source code; generating a diagram including diagram elements that visually represent the portions of source code; and correlating the diagram elements to the corresponding portions of the textual documentation.

In accordance with articles of manufacture consistent with the present invention a computer-readable medium containing instructions for controlling a data processing system to perform a method is provided. The method comprising the steps of generating textual documentation that describes the source code, the textual documentation having portions that correspond to portions of the source code; generating a diagram including diagram elements that visually represent the portions of source code; and correlating the diagram elements to the corresponding portions of the textual documentation.

In accordance with systems consistent with the present invention, a data processing system is provided. The data processing system comprises a secondary storage device containing a software project, the software project comprising source code; a memory comprising a software development tool that generates documentation that describes the source code, the documentation including a diagram portion and a text portion and having links between the diagram portion and the text portion; and a processor for running the software development tool.

In accordance with methods consistent with the present invention a method for generating documentation is provided. The method comprises the steps of generating textual documentation that describes the source code, generating images corresponding to the diagram that are displayable by an application, mapping the images into regions, and generating hyperlink references from the rectangular regions to the textual documentation.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 24 depicts exemplary source code in a software project; and

FIG. 25 depicts textual documentation for the source code depicted in FIG. 24.

DETAILED DESCRIPTION OF THE INVENTION

Methods and systems consistent with the present invention provide an improved software development tool that creates a graphical representation of source code regardless of the programming language in which the code is written. In addition, the software development tool simultaneously reflects any modifications to the source code to both the display of the graphical representation as well as the textual display of the source code.

Figure 1:
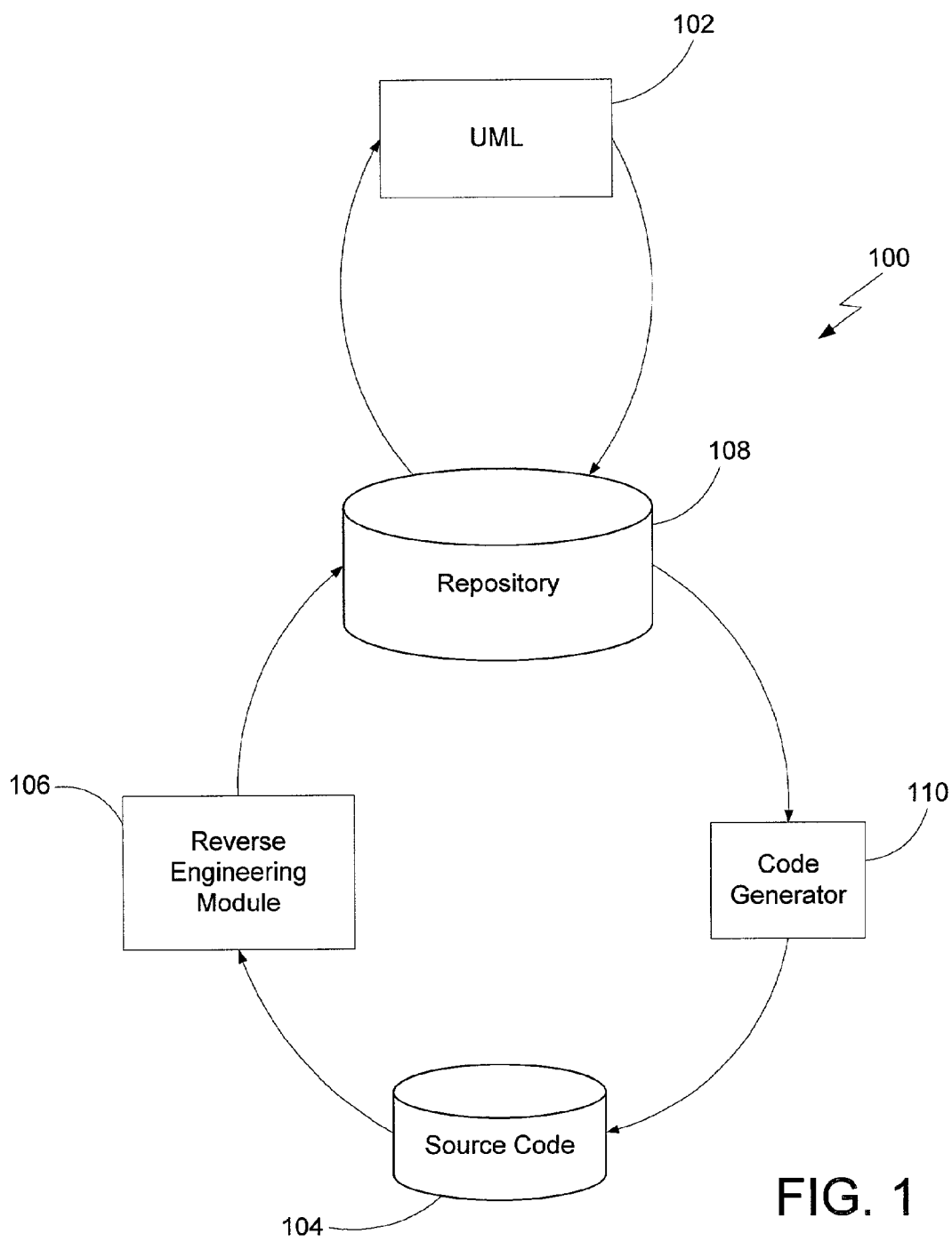
FIG. 1 depicts a conventional software development tool.
Figure 2:
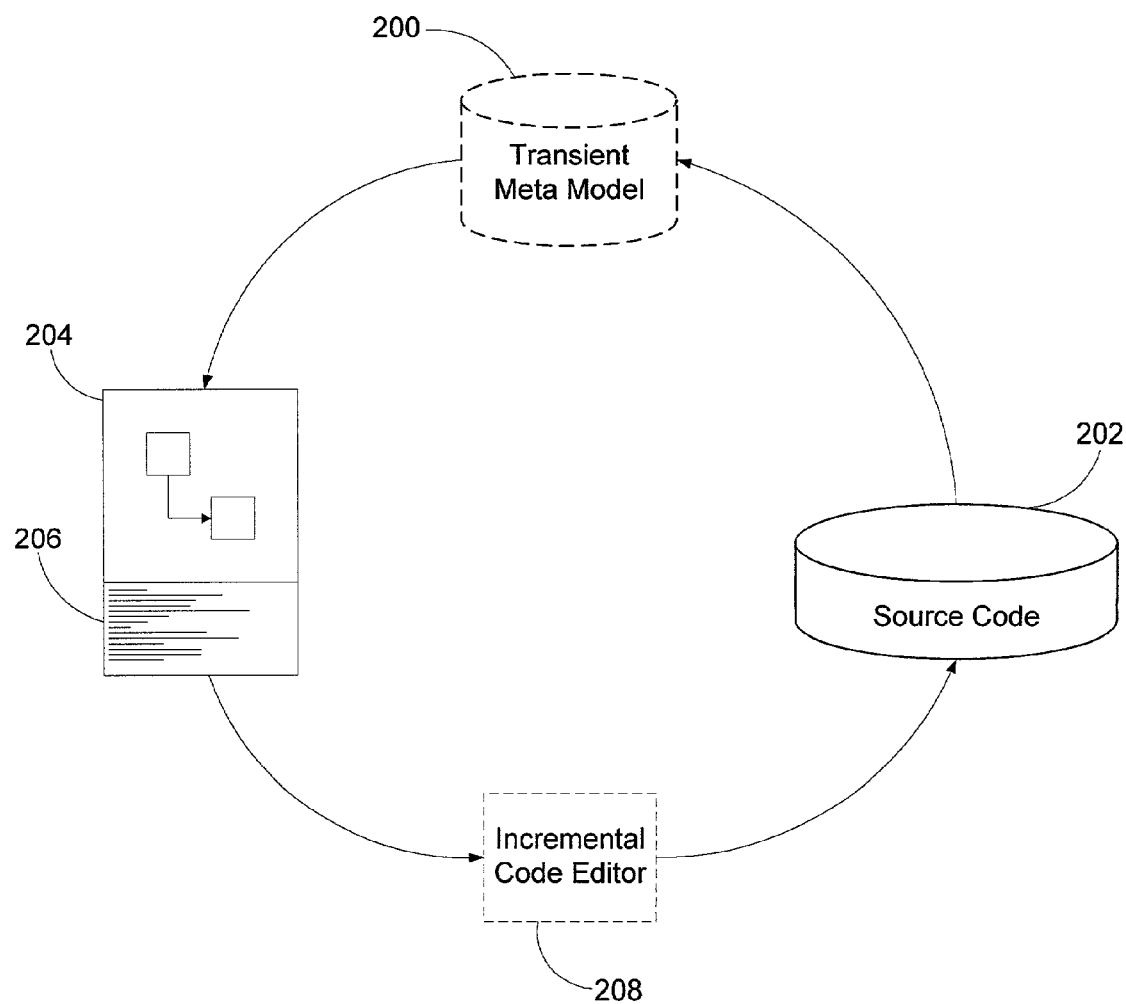
FIG. 2 depicts an overview of a software development tool in accordance with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Alternatively, the textual view 206 of the source code may be obtained directly from the source code file. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
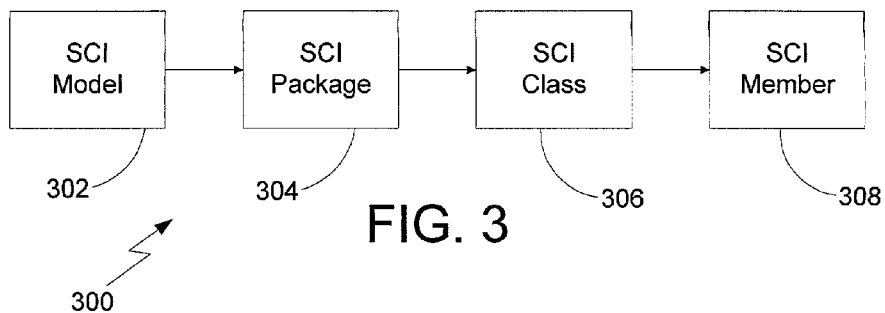
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
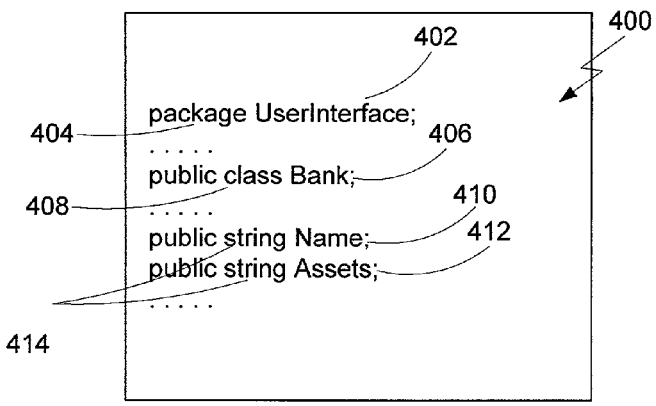
FIG. 4 depicts representative source code.
Figure 5:
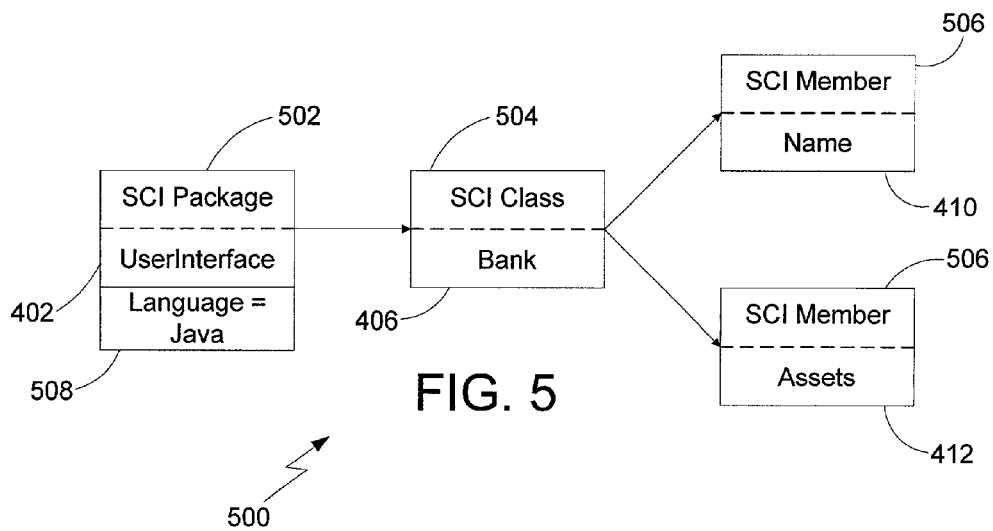
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ language.

Figure 6:
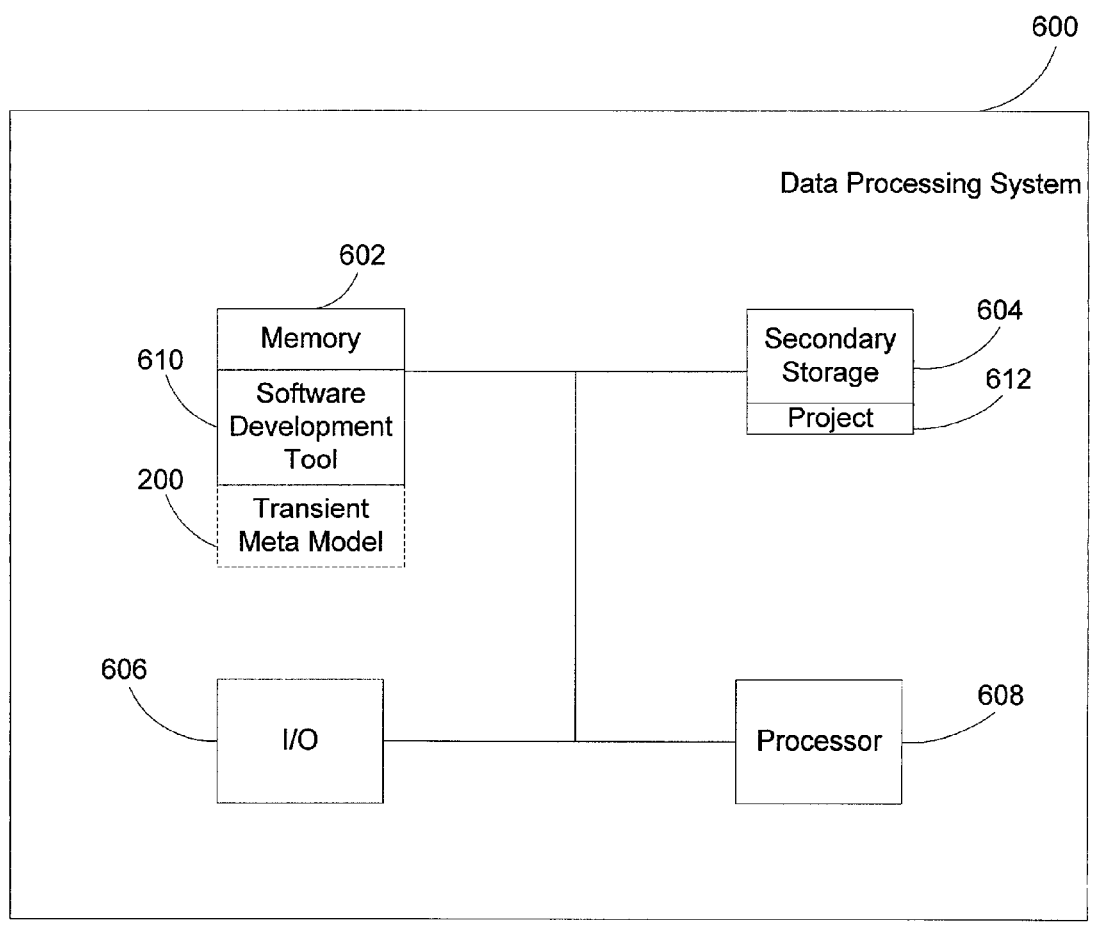
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks or CD-ROM; a carrier wave from a network, such as Internet; or other forms of RAM or ROM either currently known or later developed.

Figure 7:
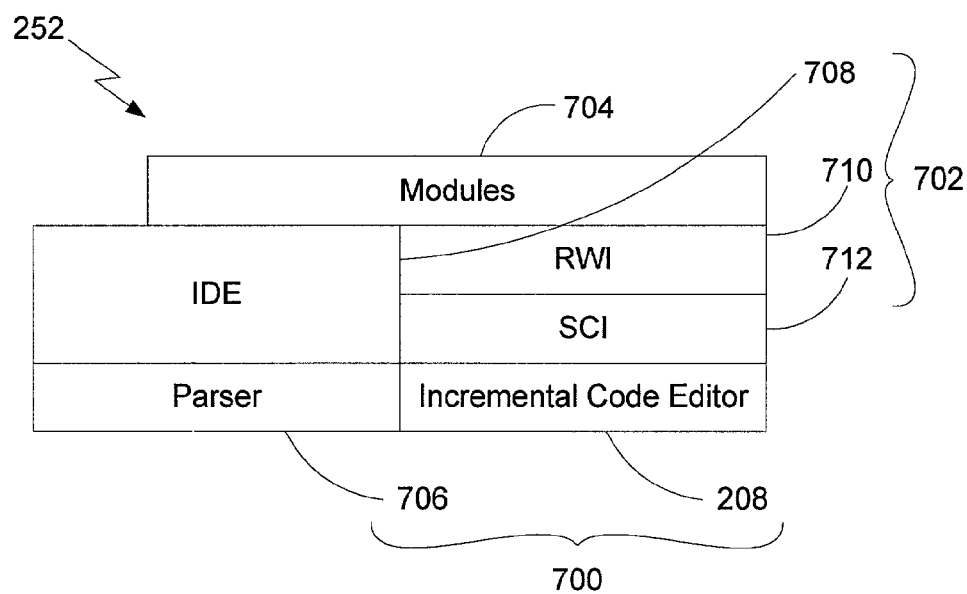
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of classes, interfaces, attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package.

RWI 710 enables the user to go deeper into the architecture. Using RWI 710, information can be extracted from and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates various complexity metrics, i.e., various measurements of the program's performance or efficiency, to support quality assurance. The types of metrics calculated by the software development tool include basic metrics, cohesion metrics, complexity metrics, coupling metrics, Halstead metrics, inheritance metrics, maximum metrics, polymorphism metrics, and ratio metrics. Examples of these metrics with their respective definitions are identified in Tables 1–9 below.

TABLE 1

Basic Metrics

| Basic Metrics | Description |
|---|---|
| Lines Of Code | Counts the number of code lines. |
| Number Of Attributes | Counts the number of attributes. If a class has a high number of attributes, it may be appropriate to divide it into subclasses. |
| Number Of Classes | Counts the number of classes. |
| Number Of Import Statements | Counts the number of imported packages/classes. This measure can highlight excessive importing, and also can be used as a measure of coupling. |
| Number Of Members | Counts the number of members, ie., attributes and operations. If a class has a high number of members, it may be appropriate to divide it into subclasses. |
| Number Of Operations | Counts the number of operations. If a class has a high number of operations, it may be appropriate to divide it into subclasses. |

TABLE 2

Cohesion Metrics

| Cohesion Metrics | Description |
|---|---|
| Lack Of Cohesion Of Methods 1 | Takes each pair of methods in the class and determines the set of fields they each access. A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. |
| Lack Of Cohesion Of Methods 3 | Measures the dissimilarity of methods in a class by attributes. A low value indicates good class subdivision, implying simplicity and high reusability. A high lack of cohesion increases complexity, thereby increasing the likelihood of errors during the development process. |

TABLE 3

Complexity Metrics

| Complexity Metrics | Description |
|---|---|
| Attribute Complexity | Defined as the sum of each attribute's value in the class. |
| Cyclomatic Complexity | Represents the cognitive complexity of the class. It counts the number of possible paths through an algorithm by counting the number of distinct regions on a flowgraph, i.e., the number of 'if,' 'for' and 'while' statements in the operation's body. |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' A class which provides a larger response set is considered to be more complex and requires more testing than one with a smaller overall design complexity. |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. |
| Weighted Methods Per Class 2 | Measures the complexity of a class, assuming that a class with more methods than another is more complex, and that a method with more parameters than another is also likely to be more complex. |

TABLE 4

Coupling Metrics

| Coupling Metrics | Description |
|---|---|
| Coupling Between Objects | Represents the number of other classes to which a class is coupled. Counts the number of reference types that are used in attribute declarations, formal parameters, return types, throws declarations and local variables, and types from which attribute and method selections are made. Excessive coupling between objects is detrimental to modular design and prevents reuse. The more independent a class is, the easier it is to reuse it in another application. In order to improve modularity and promote encapsulation, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |

TABLE 4-continued

Coupling Metrics

| Coupling Metrics | Description |
| --- | --- |
| Data Abstraction Coupling | Counts the number of reference types used in the attribute declarations. |
| FanOut | Counts the number of reference types that are used in attribute declarations, formal parameters, return types, throws declarations and local variables. |

TABLE 5

Halstead Metrics

| Halstead Metrics | Description |
| --- | --- |
| Halstead Difficulty | This measure is one of the Halstead Software Science metrics. It is calculated as ('Number of Unique Operators'/'Number of Unique Operands') * ('Number of Operands'/'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |
| Halstead Program Vocabulary | This measure is one of the Halstead Software Science metrics. It is calculated as 'Number of Unique Operators' + 'Number of Unique Operands.' |
| Halstead Program Volume | This measure is one of the Halstead Software Science metrics. It is calculated as 'Halstead Program Length' * Log2('Halstead Program Vocabulary'). |
| Number Of Operands | This measure is used as an input to the Halstead Software Science metrics. It counts the number of operands used in a class. |
| Number Of Operators | This measure is used as an input to the Halstead Software Science metrics. It counts the number of operators used in a class. |
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

Inheritance Metrics

| Inheritance Metrics | Description |
| --- | --- |
| Depth Of Inheritance Hierarchy | Counts how far down the inheritance hierarchy a class or interface is declared. High values imply that a class is quite specialized. |
| Number Of Child Classes | Counts the number of classes which inherit from a particular class, i.e., the number of classes in the inheritance tree down from a class. Non-zero value indicates that the particular class is being re-used. The abstraction of the class may be poor if there are too many child classes. It should also be stated that a high value of this measure points to the definite amount of testing required for each child class. |

TABLE 7

Maximum Metrics

| Maximum Metrics | Description |
| --- | --- |
| Maximum Number Of Levels | Counts the maximum depth of 'if,' 'for' and 'while' branches in the bodies of methods. Logical units with a large number of nested levels may need implementation simplification and process improvement because groups that contain more than seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |
| Maximum Size Of Operation | Counts the maximum size of the operations for a class. Method size is determined in terms of cyclomatic complexity, i.e., the number of 'if,' 'for' and 'while' statements in the operation's body. |

TABLE 8

Polymorphism Metrics

| Polymorphism Metrics | Description |
| --- | --- |
| Number Of Added Methods | Counts the number of operations added by a class. A large value of this measure indicates that the functionality of the given class becomes increasingly distinct from that of the parent classes. In this case, it should be considered whether this class genuinely should be inheriting from the parent, or if it could be broken down into several smaller classes. |
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |

TABLE 9

Ratio Metrics

| Ratio Metrics | Description |
| --- | --- |
| Comment Ratio | Counts the ratio of comments to total lines of code including comments. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. |

The QA module also provides audits, i.e., the module checks for conformance to predefined or user-defined styles. The types of audits provided by the module include coding style, critical errors, declaration style, documentation, naming style, performance, possible errors and superfluous content. Examples of these audits with their respective definitions are identified in Tables 10–17 below.

TABLE 10

Coding Style Audits

| Coding Style Audits | Description |
| --- | --- |
| Access Of Static Members Through Objects | Static members should be referenced through class names rather than through objects. |
| Assignment To Formal Parameters | Formal parameters should not be assigned. |
| Complex Assignment | Checks for the occurrence of multiple assignments and assignments to variables within the same expression. Complex assignments should be avoided since they decrease program readability. |
| Don't Use the Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Provide Incremental In For-Statement or use while-statement | Checks if the third argument of the 'for'-statement is missing. |
| Replacement For Demand Imports | Demand import-declarations must be replaced by a list of single import-declarations that are actually imported into the compilation unit. In other words, import-statements may not end with an asterisk. |
| Use Abbreviated Assignment Operator | Use the abbreviated assignment operator in order to write programs more rapidly. Also some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 11

Critical Errors Audit

| Critical Errors Audits | Description |
| --- | --- |
| Avoid Hiding Inherited Attributes | Detects when attributes declared in child classes hide inherited attributes. |
| Avoid Hiding Inherited Static Methods | Detects when inherited static operations are hidden by child classes. |
| Command Query Separation | Prevents methods that return a value from a modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case. Imagine that ClassB is in a different package than ClassA. Then the allocation of ClassB violates this rule since the second constructor is not visible at the point of the allocation, but it still matches the allocation (based on signature). Also the call to open in ClassB violates this rule since the second and the third declarations of open are not visible at the point of the call, but it still matches the call (based on signature). |
| Multiple Visible Declarations With Same Name | Multiple declarations with the same name must not be simultaneously visible except for overloaded methods. |
| Overriding a Non-Abstract Method With an Abstract Method | Checks for abstract methods overriding non-abstract methods in a subclass. |
| Overriding a Private Method | A subclass should not contain a method with the same name and signature as in a superclass if these methods are declared to be private. |
| Overloading Within a Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass—i.e., the intention of the user is to override the method in the superclass, but due to |

TABLE 11-continued

Critical Errors Audit

| Critical Errors Audits | Description |
|---|---|
| | the error, the subclass method ends up overloading the superclass method. |
| Use of Static Attribute for Initialization | Non-final static attributes should not be used in initializations of attributes. |

TABLE 12

Declaration Style Audits

| Declaration Style Audits | Description |
|---|---|
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |
| Order Of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put the Main Function Last | Tries to make the program comply with various coding standards regarding the form of the class definitions. |

TABLE 13

Documentation Audits

| Documentation Audits | Description |
|---|---|
| Bad Tag In JavaDoc Comments | This rule verifies code against accidental use of improper JavaDoc tags. |
| Distinguish Between JavaDoc And Ordinary Comments | Checks whether the JavaDoc comments in your program ends with '**/' and ordinary C-style ones with '*/.' |

TABLE 14

Naming Style Audits

| Naming Style Audits | Description |
|---|---|
| Class Name Must Match Its File Name | Checks whether top level classes or interfaces have the same name as the file in which they reside. |
| Group Operations With Same Name Together | Enforces standard to improve readability. |
| Naming Conventions | Takes a regular expression and item name and reports all occurrences where the pattern does not match the declaration. |
| Names Of Exception Classes | Names of classes which inherit from Exception should end with Exception. |

TABLE 14-continued

Naming Style Audits

| Naming Style Audits | Description |
|---|---|
| Use Conventional Variable Names | One-character local variable or parameter names should be avoided, except for temporary and looping variables, or where a variable holds an undistinguished value of a type. |

TABLE 15

Performance Audits

| Performance Audits | Description |
|---|---|
| Avoid Declaring Variables Inside Loops | This rule recommends declaring local variables outside the loops since declaring variables inside the loop is less efficient. |
| Append To String Within a Loop | Performance enhancements can be obtained by replacing String operations with StringBuffer operations if a String object is appended within a loop. |
| Complex Loop Expressions | Avoid using complex expressions as repeat conditions within loops. |

TABLE 16

Possible Error Audits

| Possible Error Audits | Description |
|---|---|
| Avoid Public And Package Attributes | Declare the attributes either private or protected, and provide operations to access or change them. |
| Avoid Statements With Empty Body | Avoid statements with empty body. |
| Assignment To For-Loop Variables | 'For'-loop variables should not be assigned. |
| Don't Compare Floating Point Types | Avoid testing for equality of floating point numbers since floating-point numbers that should be equal are not always equal due to rounding problems. |
| Enclosing Body Within a Block | The statement of a loop must always be a block. The 'then' and 'else' parts of 'if'-statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurring first. |
| Method finalize() Doesn't Call super.finalize() | Calling of super.finalize() from finalize() is good practice of programming, even if the base class doesn't define the finalize() method. This makes class implementations less dependent on each other. |
| Mixing Logical Operators Without Parentheses | An expression containing multiple logical operators should be parenthesized properly. |
| No Assignments In Conditional Expressions | Use of assignment within conditions makes the source code hard to understand. |
| Use 'equals' Instead Of '==' | The '==' operator used on strings checks if two string objects are two identical objects. In most situations, however, one likes to simply check if two strings have the same value. In these cases, the 'equals' method should be used. |
| Use 'L' Instead Of 'l' at the end of integer constant | It is better to use uppercase 'L' to distinguish the letter 'l' from the number '1.' |
| Use Of the 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 17

Superfluous Content Audits

| Superfluous Content Audits | Description |
| --- | --- |
| Duplicate Import Declarations | There should be at most one import declaration that imports a particular class/package. |
| Don't Import the Package the Source File Belongs To | No classes or interfaces need to be imported from the package to which the source code file belongs. Everything in that package is available without explicit import statements. |
| Explicit Import Of the java.lang Classes | Explicit import of classes from the package 'java.lang' should not be performed. |
| Equality Operations On Boolean Arguments | Avoid performing equality operations on Boolean operands. 'True' and 'false' literals should not be used in conditional clauses. |
| Imported Items Must Be Used | It is not legal to import a class or an interface and never use it. This rule checks classes and interfaces that are explicitly imported with their names - that is not with import of a complete package, using an asterisk. If unused class and interface imports are omitted, the amount of meaningless source code is reduced - thus the amount of code to be understood by a reader is minimized. |
| Unnecessary Casts | Checks for the use of type casts that are not necessary. |
| Unnecessary 'instanceof' Evaluations | Verifies that the runtime type of the left-hand side expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |

Figure 8A:
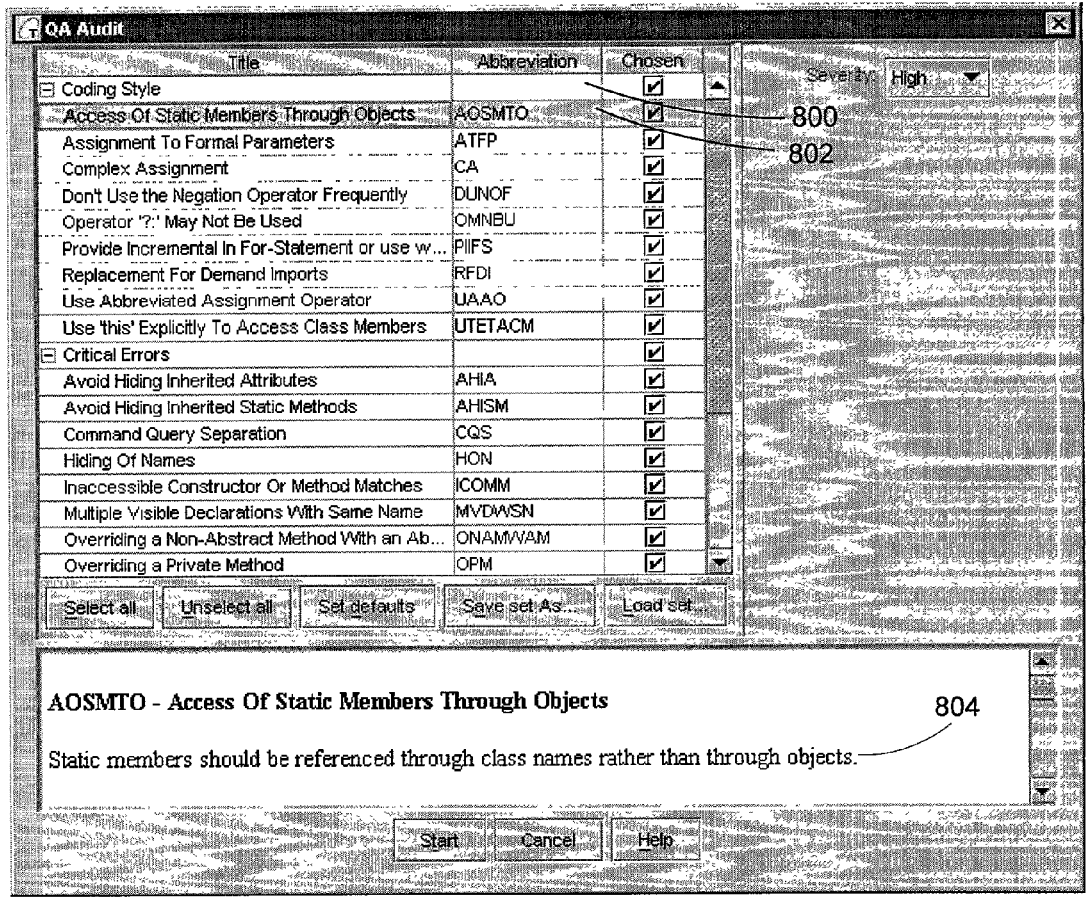
FIG. 8A depicts a user interface displayed by the software development tool depicted in FIG. 2, where the user interface displays a list of predefined criteria which the software development tool checks in the source code.
Figure 8B:
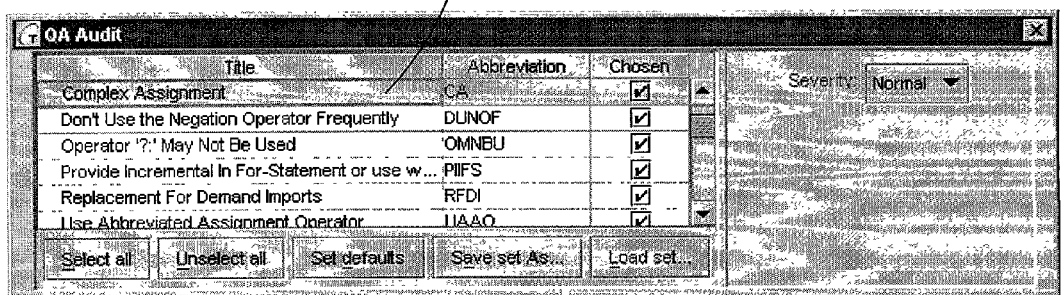
FIG. 8B depicts a user interface displayed by the software development tool depicted in FIG. 2, where the user interface displays the definition of the criteria which the software development tool checks in the source code, and an example of source code which does not conform to the criteria.
Figure 8C:
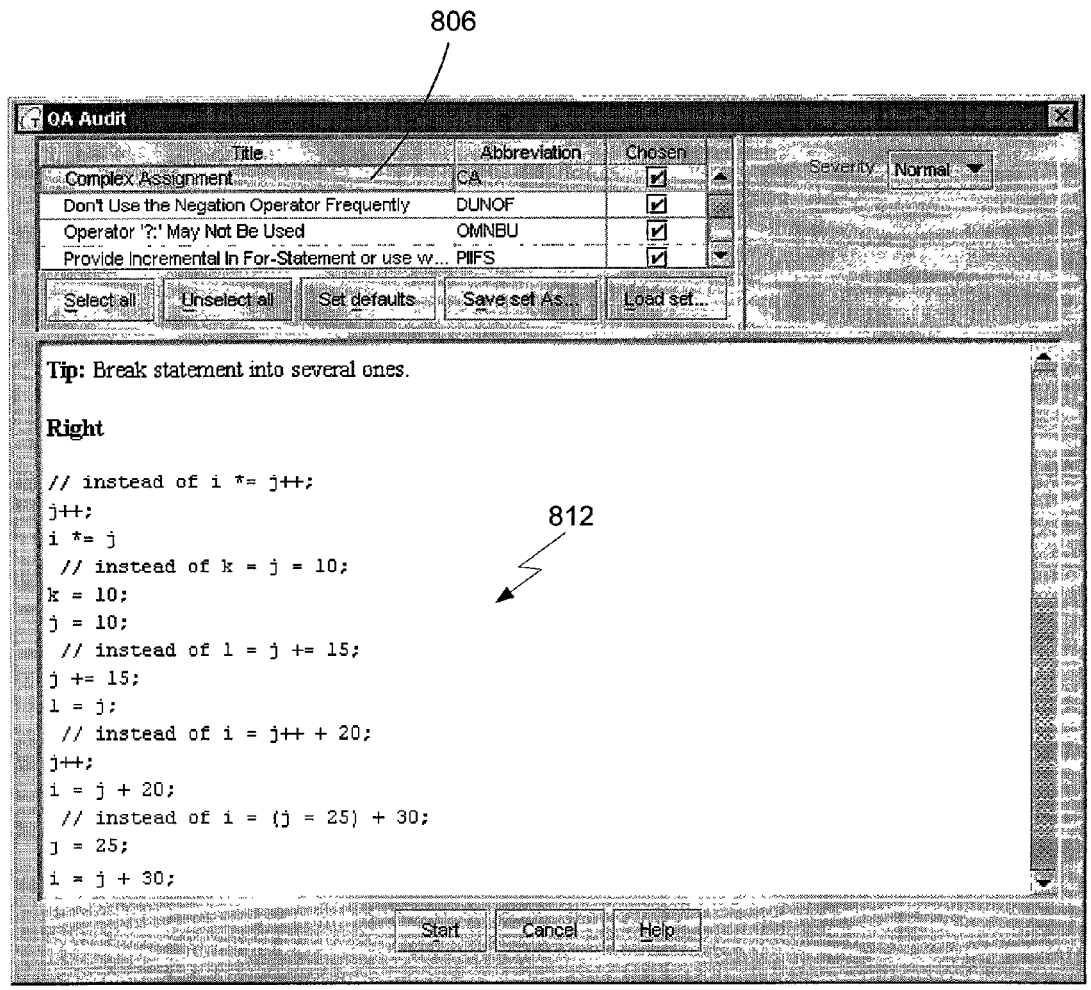
FIG. 8C depicts a user interface displayed by the software development tool depicted in FIG. 2, where the user interface displays an example of source code which conforms to the criteria which the software development tool checks in the source code.

If the QA module determines that the source code does not conform, an error message is provided to the developer. For example, as depicted in FIG. 8A, the software development tool checks for a variety of coding styles 800. If the software development tool were to check for "Access Of Static Members Through Objects" 802, it would verify whether static members are referenced through class names rather than through objects 804. Further, as depicted in FIG. 8B, if the software development tool were to check for "Complex Assignment" 806, the software development tool would check for the occurrence of multiple assignments and assignments to variables within the same expression to avoid complex assignments since these decrease program readability 808. An example of source code having a complex assignment 810 and source code having a non-complex assignment 812 are depicted in FIGS. 8B and 8C, respectively. The QA module of the software development tool scans the source code for other syntax errors and/or other deviations from well known rules, as described above, and provides an error message if any such errors are detected.

The improved software development tool of the present invention is used to develop source code in a project. The project comprises a plurality of files and the source code of a chosen one of the plurality of files is written in a given language. The software development tool determines the language of the source code of the chosen file, converts the source code from the language into a language-neutral representation, uses the language-neutral representation to textually display the source code of the chosen file in the language, and uses the language-neutral representation to display a graphical representation of at least a portion of the project. As discussed above, in an alternative embodiment, the textual display may be obtained directly from the source code file. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to predefined or user-defined styles, as described above. The modification to the source code may be received by the software development tool via the programmer editing the source code in the textual pane or the graphical pane, or via some other independent software tool that the programmer uses to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 9:
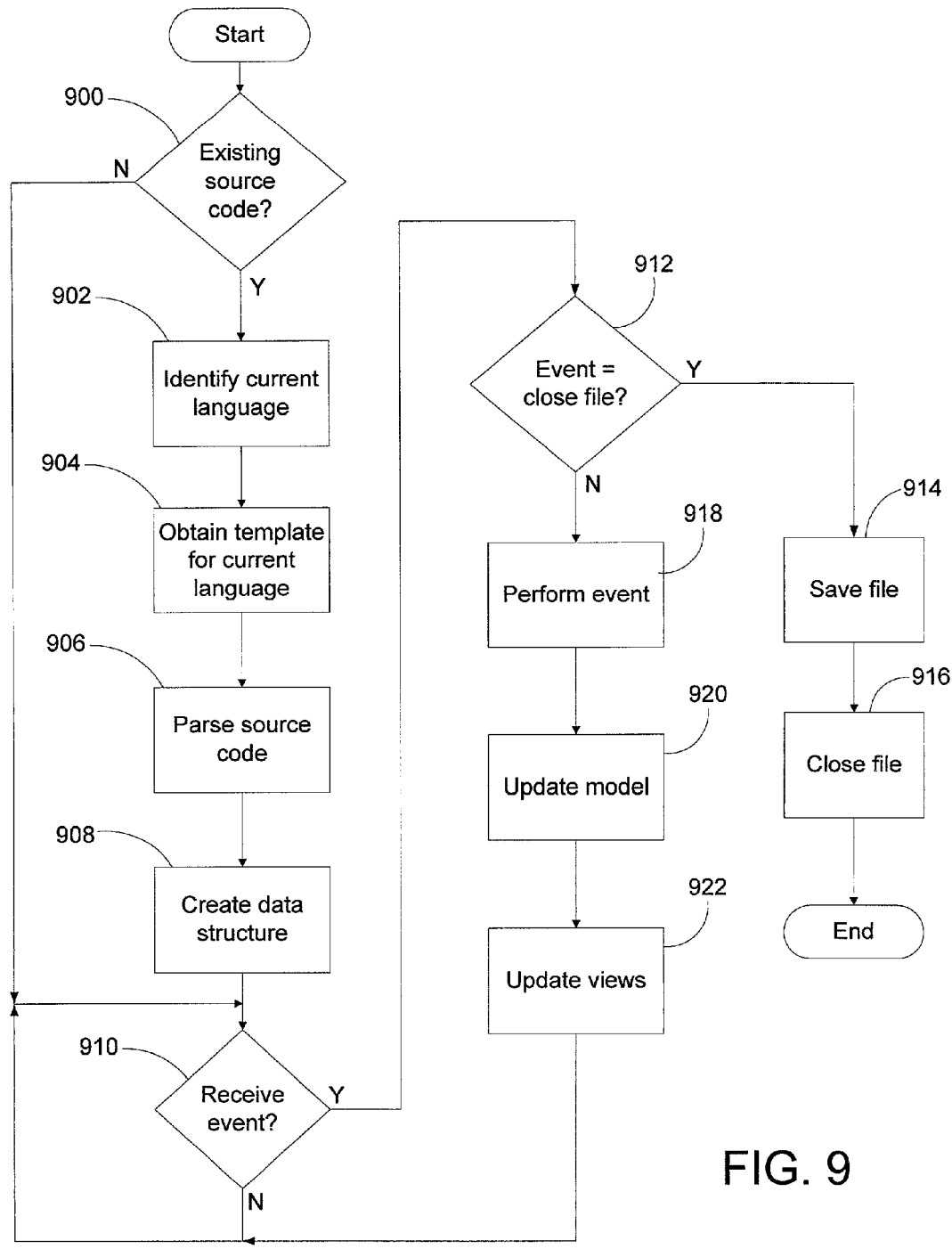
FIG. 9 depicts a flow diagram of the steps performed by the software development tool depicted in FIG. 2.

FIG. 9 depicts a flow diagram of the steps performed by the software development tool to develop a project in accordance with methods consistent with the present invention. As previously stated, the project comprises a plurality of files. The developer either uses the software development tool to open a file that contains existing source code, or to create a file in which the source code will be developed. If the software development tool is used to open the file, determined in step 900, the software development tool initially determines the programming language in which the code is written (step 902). The language is identified by the extension of the file, e.g., ".java" identifies source code written in the Java™ language, while ".cpp" identifies source code written in C++. The software development tool then obtains a template for the current programming language, i.e., a collection of generalized definitions for the particular language that can be used to build the data structure (step 904). For example, the templates used to define a new Java™ class contains a default name, e.g., "Class1," and the default code, "public class Class1 {}." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 906), and create the data structure (step 908). After creating the data structure or if there is no existing code, the software development tool awaits an event, i.e., a modification or addition to the source code by the developer (step 910). If an event is received and the event is to close the file (step 912), the file is saved (step 914) and closed (step 916). Otherwise, the software development tool performs the event (step 918), i.e., the tool makes the modification. The software development tool then updates the TMM or model (step 920), as discussed in detail below, and updates both the graphical and the textual views (step 922).

Figure 10A:
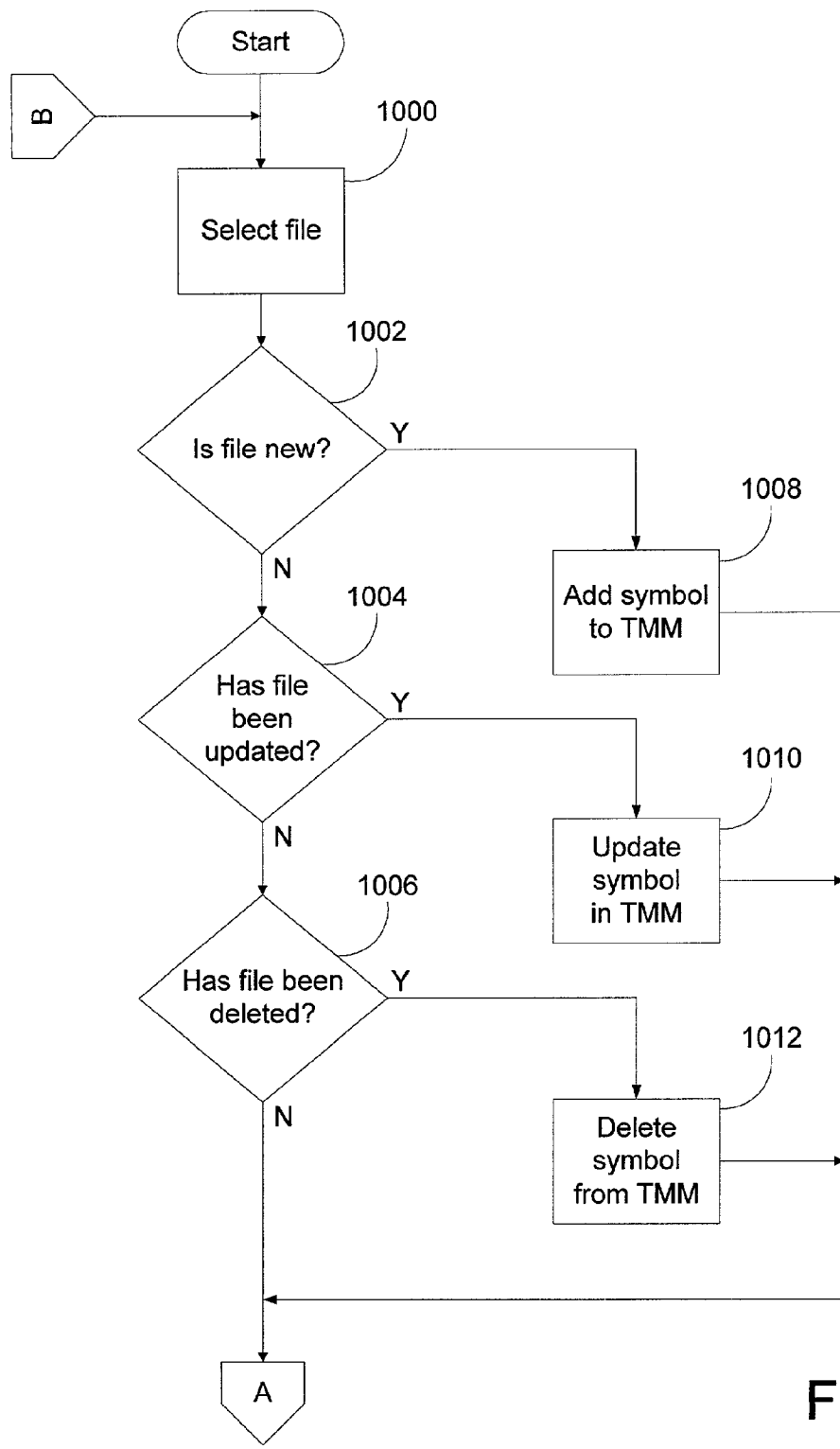
FIGS. 10A and 10B depict a flow diagram illustrating the update model step of FIG. 9.
Figure 10B:
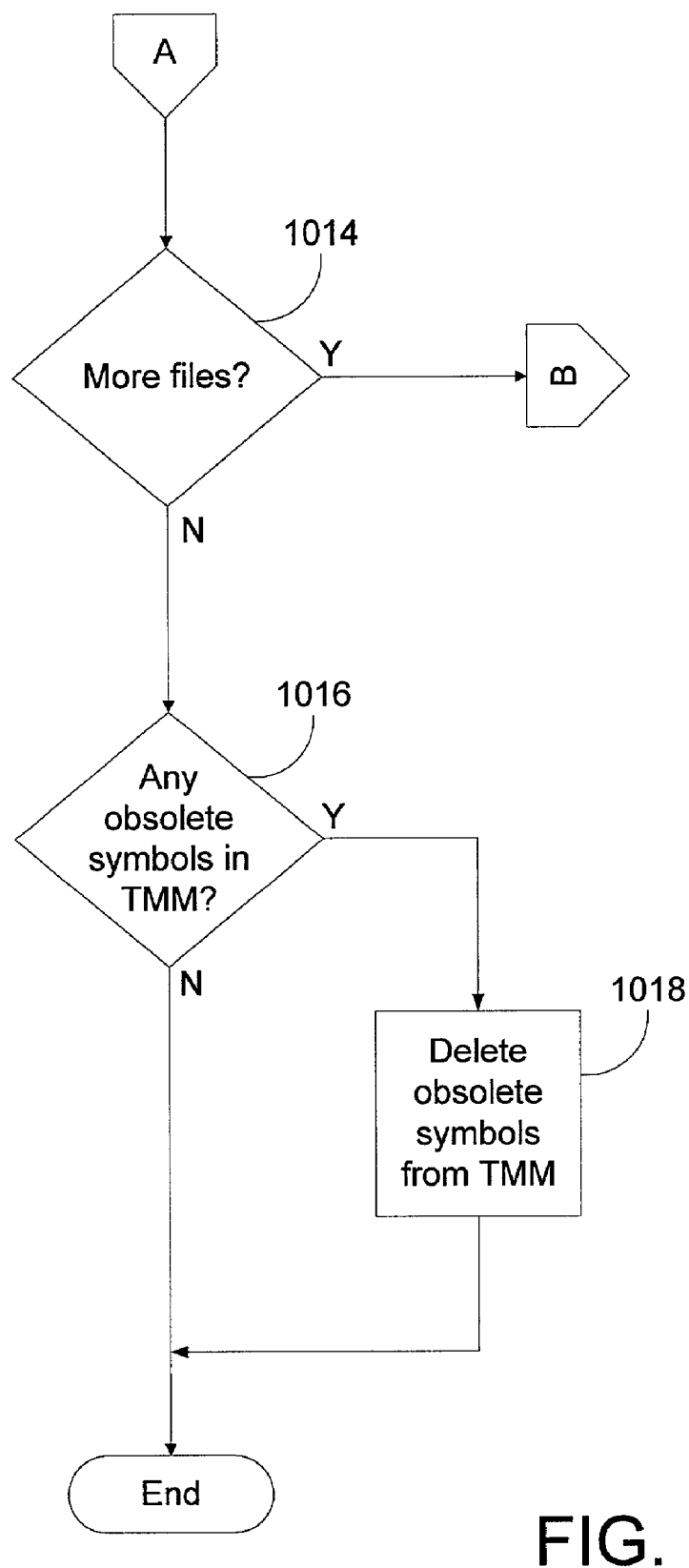

FIGS. 10A and 10B depict a flow diagram illustrating the update model step of FIG. 9. The software development tool selects a file from the project (step 1000), and determines whether the file is new (step 1002), whether the file has been updated (step 1004), or whether the file has been deleted (step 1006). If the file is new, the software development tool adds the additional symbols from the file to the TMM (step 1008). To add the symbol to the TMM, the software development tool uses the template to parse the symbol to the TMM. If the file has been updated, the software development tool updates the symbols in the TMM (step 1010). Similar to the addition of a symbol to the TMM, the software development tool uses the template to parse the symbol to the TMM. If the file has been deleted, the software development tool deletes the symbols in the TMM (step 1012). The software development tool continues this analysis for all files in the project. After all files are analyzed (step 1014), any obsolete symbols in the TMM (step 1016) are deleted (step 1018).

Figure 11:
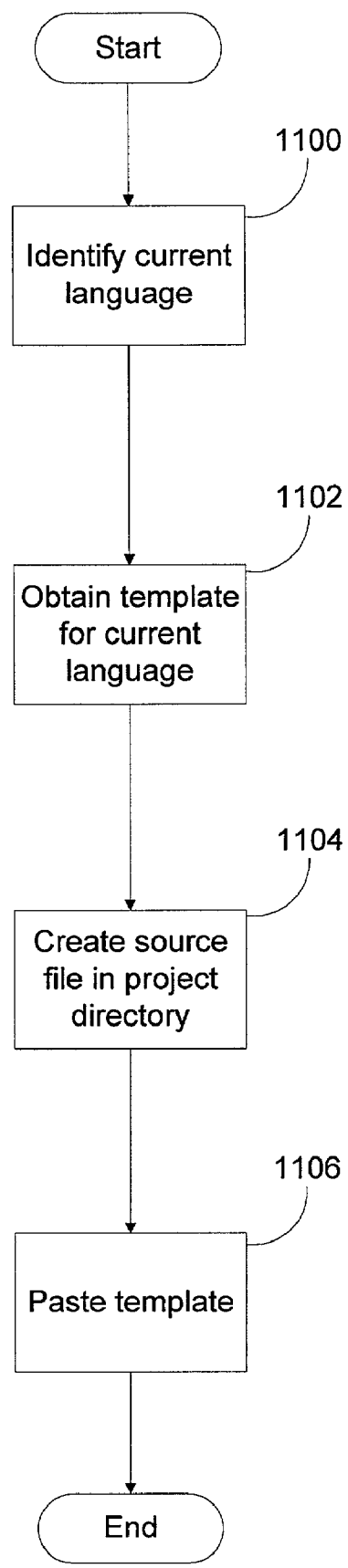
FIG. 11 depicts a flow diagram of the steps performed by the software development tool in FIG. 2 when creating a class.

FIG. 11 depicts a flow diagram illustrating the performance of an event, specifically the creation of a class, in accordance with methods consistent with the present invention. After identifying the programming language (step 1100), the software development tool obtains a template for the language (step 1102), creates a source code file in the project directory (step 1104), and pastes the template into the file (step 1106). The project directory corresponds to the SCI model 302 of FIG. 3. Additional events which a developer may perform using the software development tool include the creation, modification or deletion of packages, projects, attributes, interfaces, links, operations, and the closing of a file.

Figure 12:
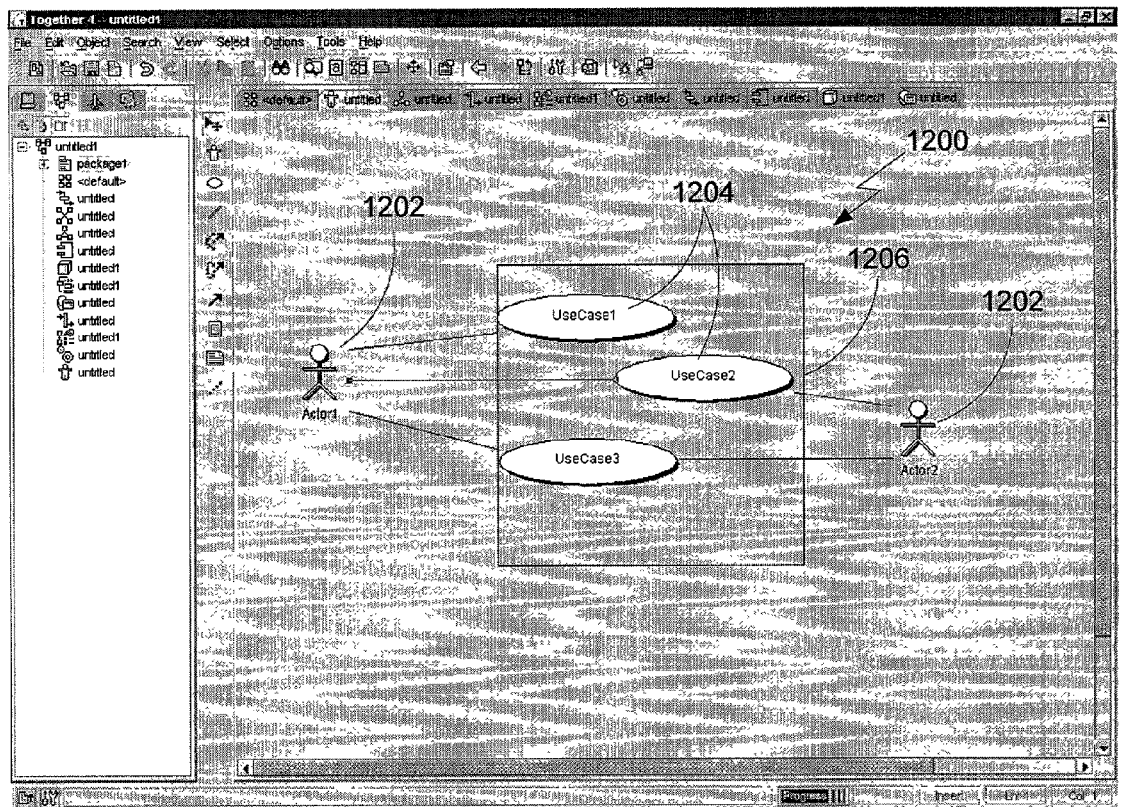
FIG. 12 depicts a user interface displayed by the software development tool depicted in FIG. 2, where the user interface displays a use case diagram of source code.
Figure 13:
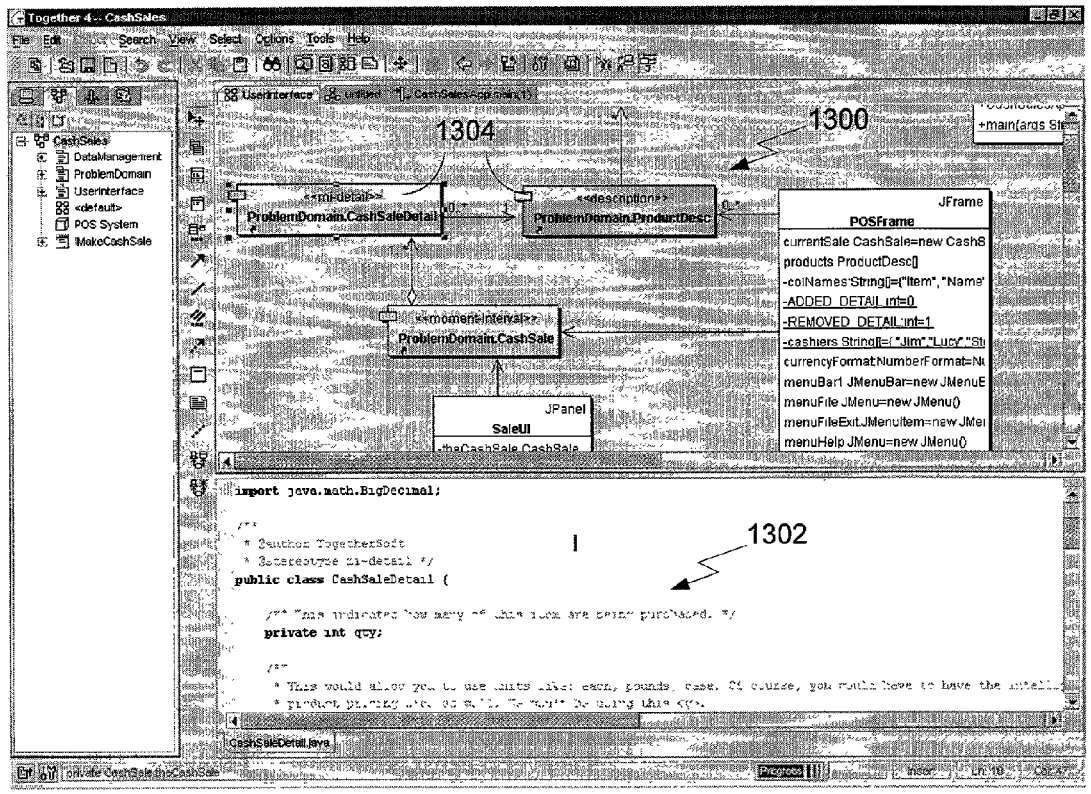
FIG. 13 depicts a user interface displayed by the software development tool depicted in FIG. 2, where the user interface displays both a class diagram and a textual view of source code.

Applications to be developed using the software development tool are collectively broken into three views of the application: the static view, the dynamic view, and the functional view. The static view is modeled using the use-case and class diagrams. A use case diagram 1200, depicted in FIG. 12, shows the relationship among actors 1202 and use cases 1204 within the system 1206. A class diagram 1300, depicted in FIG. 13 with its associated source code 1302, on the other hand, includes classes 1304, interfaces, packages and their relationships connected as a graph to each other and to their contents.

Figure 14:
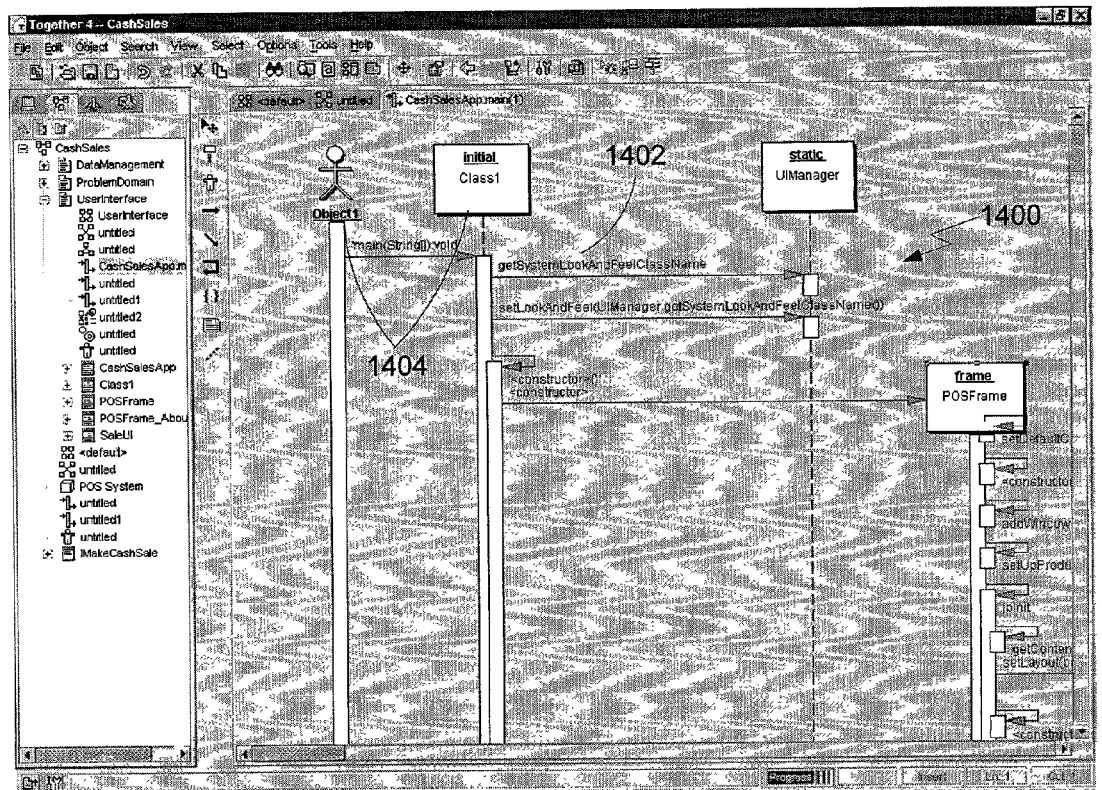
FIG. 14 depicts a user interface displayed by the software development tool depicted in FIG. 2, where the user interface displays a sequence diagram of source code.
Figure 15:
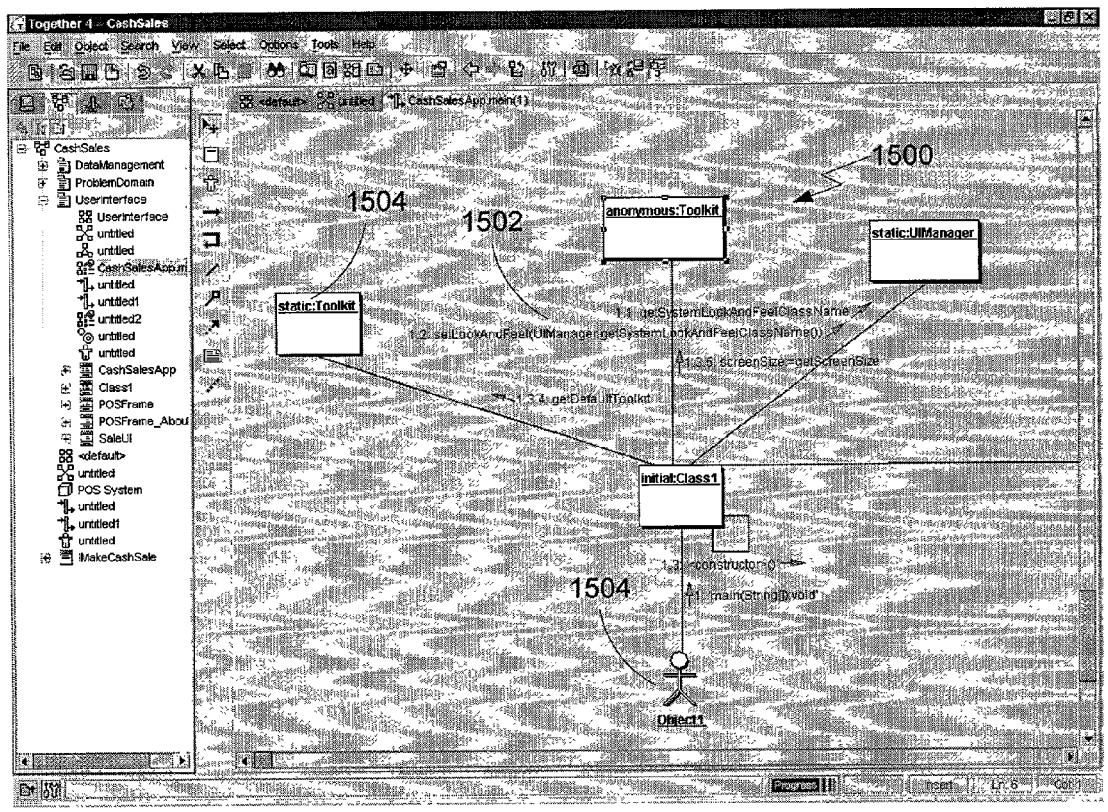
FIG. 15 depicts a user interface displayed by the software development tool depicted in FIG. 2, where the user interface displays a collaboration diagram of source code.

The dynamic view is modeled using the sequence, collaboration and statechart diagrams. As depicted in FIG. 14, a sequence diagram 1400 represents an interaction, which is a set of messages 1402 exchanged among objects 1404 within a collaboration to effect a desired operation or result. In a sequence diagram 1400, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1400 (FIG. 14), which emphasize the time ordering of messages along the vertical axis, collaboration diagrams 1500 (FIG. 15) emphasize the structural organization of objects.

Figure 16:
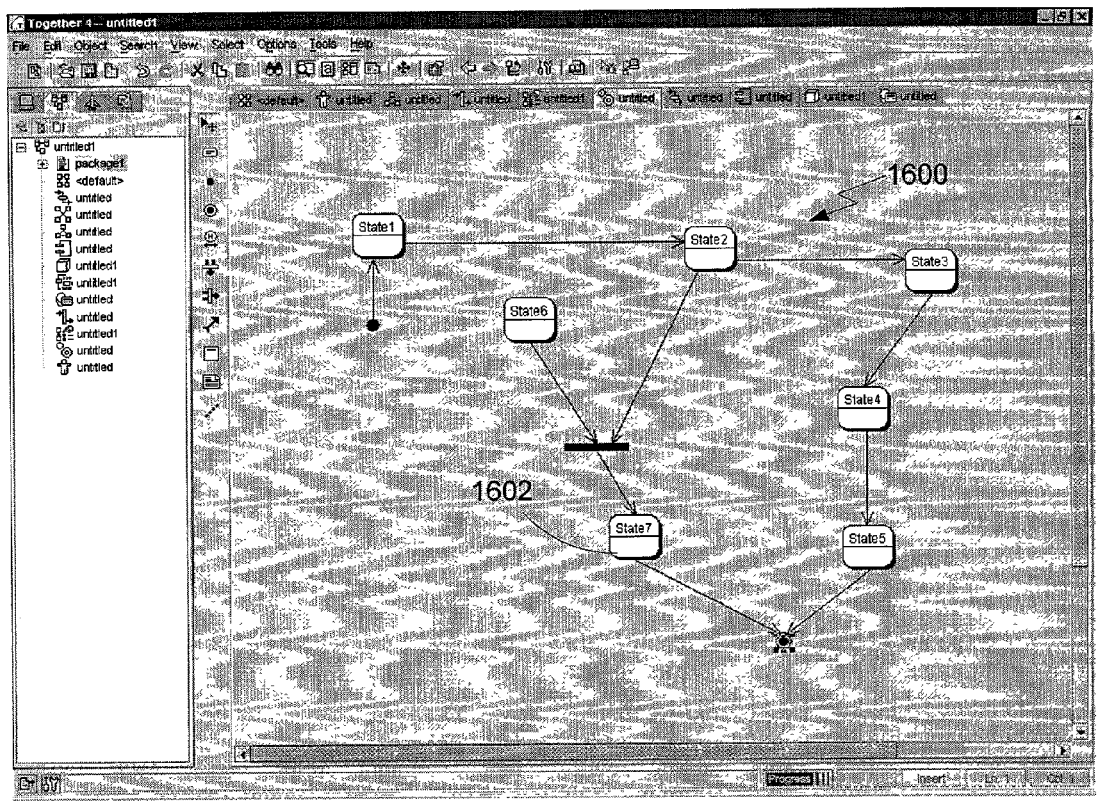
FIG. 16 depicts a user interface displayed by the software development tool depicted in FIG. 2, where the user interface displays a statechart diagram of source code.

A statechart diagram 1600 is depicted in FIG. 16. The statechart diagram 1600 includes the sequences of states 1602 that an object or interaction goes through during its life in response to stimuli, together with its responses and actions. It uses a graphic notation that shows states of an object, the events that cause a transition from one state to another, and the actions that result from the transition.

Figure 17:
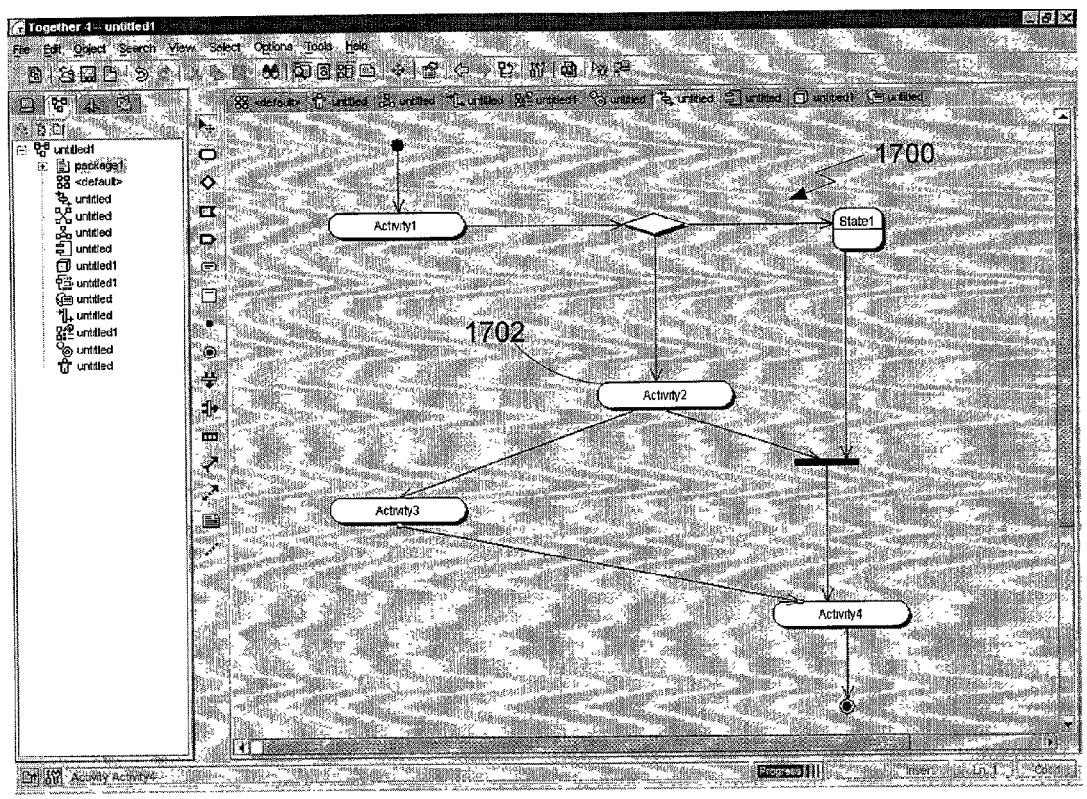
FIG. 17 depicts a user interface displayed by the software development tool depicted in FIG. 2, where the user interface displays an activity diagram of source code.

The functional view can be represented by activity diagrams 1700 and more traditional descriptive narratives such as pseudocode and minispecifications. An activity diagram 1700 is depicted in FIG. 17, and is a special case of a state diagram where most, if not all, of the states are action states 1702 and where most, if not all, of the transitions are triggered by completion of the actions in the source states. Activity diagrams 1700 are used in situations where all or most of the events represent the completion of internally generated actions.

Figure 18:
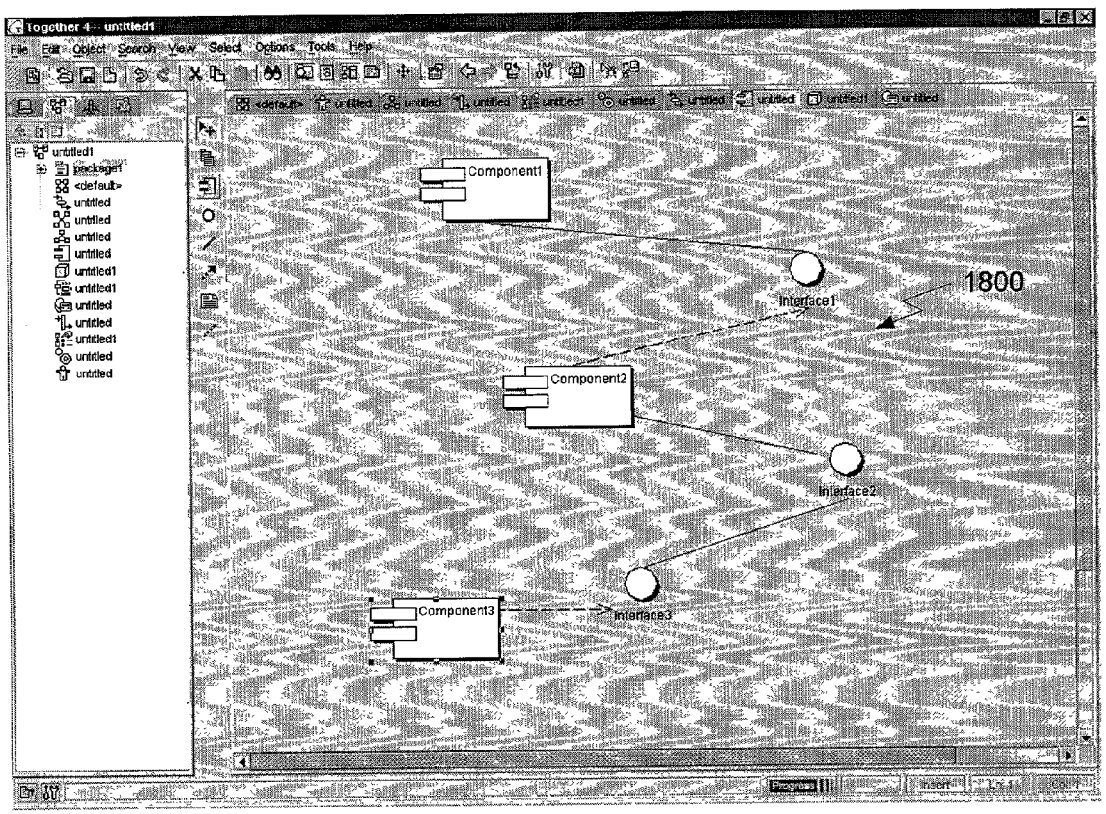
FIG. 18 depicts a user interface displayed by the software development tool depicted in FIG. 2, where the user interface displays a component diagram of source code.
Figure 19:
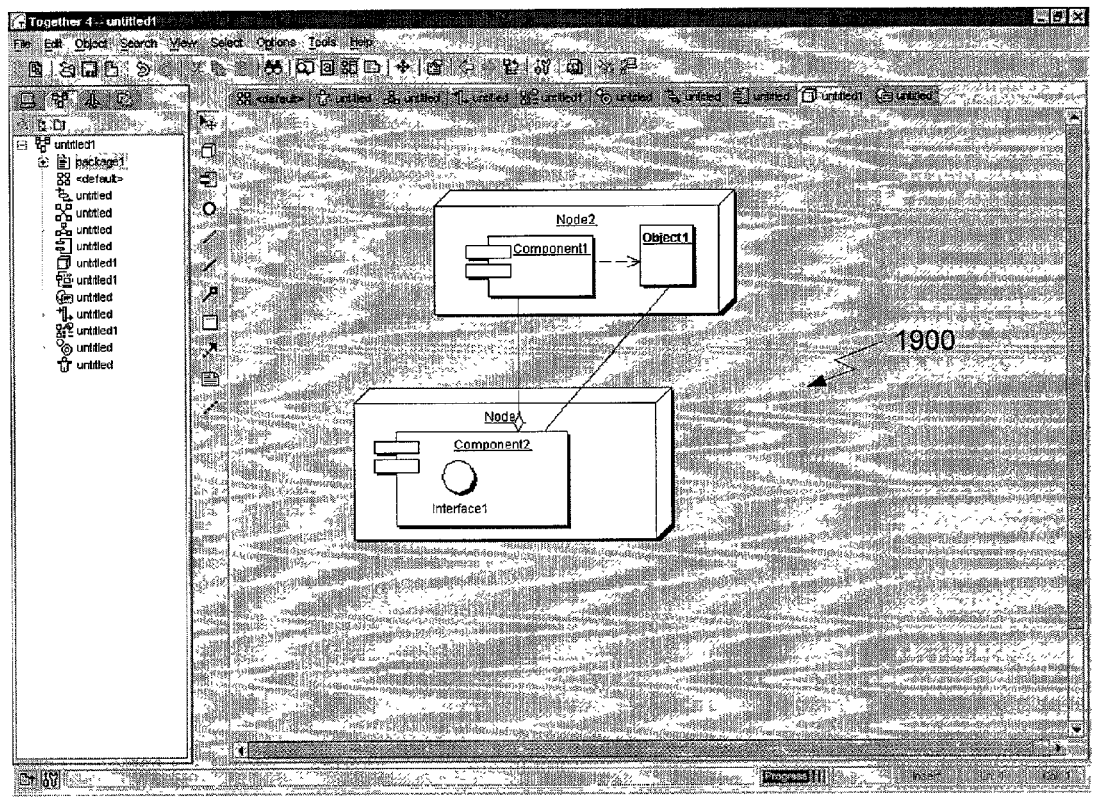
FIG. 19 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1800, depicted in FIG. 18, are graphical representations of a system or its component parts. Component diagrams 1800 show the dependencies among software components, including source code components, binary code components and executable components. As depicted in FIG. 19, deployment diagrams 1900 are used to show the distribution strategy for a distributed object system. Deployment diagrams 1900 show the configuration of run-time processing elements and the software components, processes and objects that live on them.

Although discussed in terms of class diagrams, one skilled in the art will recognize that the software development tool of the present invention may support these and other graphical views.

Generated Documentation

In addition to the functionality described above, the improved software development tool automatically generates hypertext markup language (HTML) documentation for a software project that includes both diagram and text portions. The improved software development tool also utilizes the linking capabilities of HTML to provide navigation links between the diagram and text portions, thus facilitating viewing and navigation through the documentation.

Thorough documentation of source code in a software project is important because it helps to explicate the structure and functionality of the source code to programmers or anyone else that was not directly involved in the development of the source code, but who nonetheless may need to debug the source code or develop new versions of the source code. The growth of the Internet and the prevalence of the use of HTML for communicating text and images over the Internet make HTML a natural choice for such documentation. HTML is a well-known publishing language for use on the World Wide Web and is more fully described in the following text, which is incorporated herein by reference: *HTML 4.0 Specification: W3C Recommendation*, (Dave Raggett, Arnaud Le Hors, & Ian Jacobs eds., iUniverse.com 1999).

The source code in a software project is often lengthy and complex and changes daily throughout the life of the software project. Therefore, it is highly desirable to provide an automated way for generating this documentation. The improved software development tool generates HTML documentation that includes both diagrammatic and textual documentation and that provides a way of navigating between the two.

Figure 20:
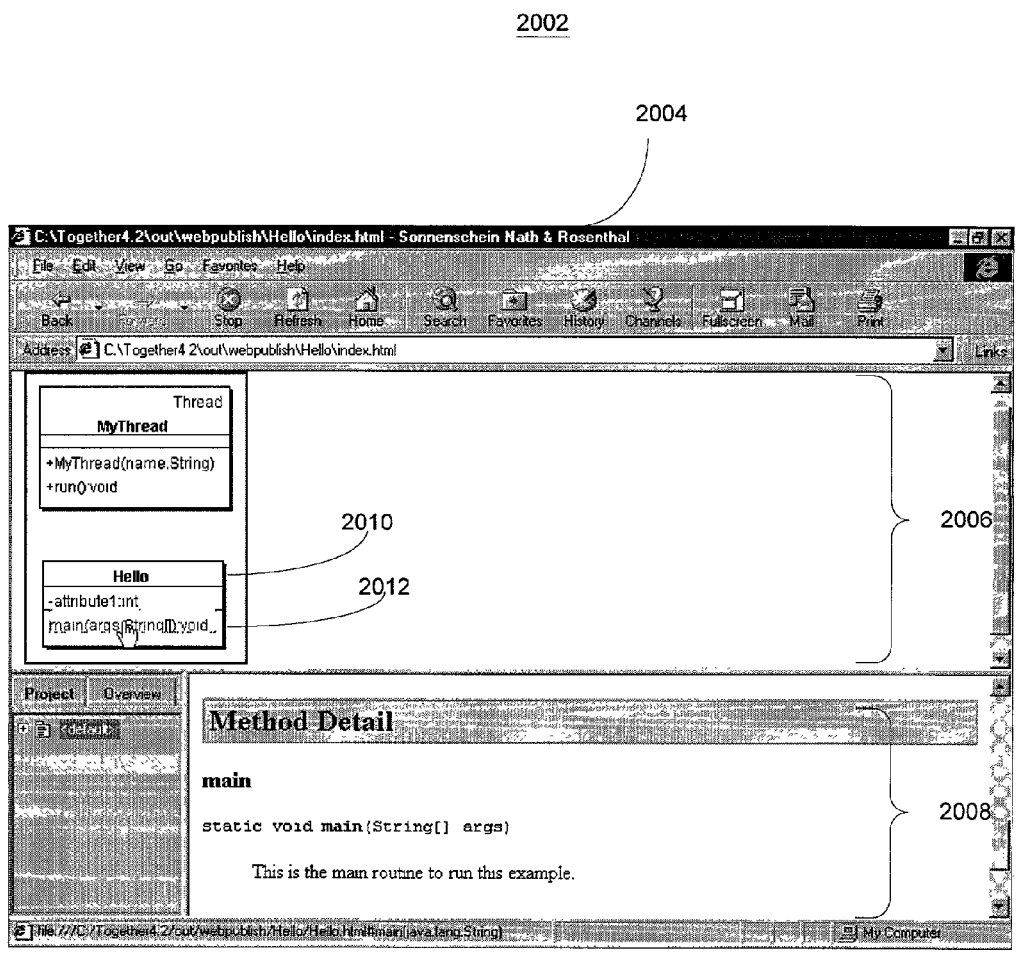
FIG. 20 depicts exemplary documentation generated by the software development tool depicted in FIG. 2.

FIG. 20 depicts an example of HTML documentation 2002 generated by the improved software development tool. In FIG. 20, HTML documentation 2002 is being displayed by a web browser 2004. Web browser 2004 is any software application suitable for viewing HTML documents, such as the Internet Explorer™ web browser (available from Microsoft Inc. of Redmond, Wash.), the Netscape Navigator™ web browser (available from Netscape Communications Corp. of Mountain View, Calif.), or the Hot Java™ web browser (available from Sun Microsystems Inc. of Palo Alto, Calif.).

Web browser 2004 displays diagram portion 2006 and textual portion 2008 in separate frames. Diagram portion 2006 is a UML diagram such as a class diagram, use case diagram, sequence diagram, collaboration diagram, statechart diagram, activity diagram, component diagram, or deployment diagram. Diagram portion 2006 may be a Graphics Interchange Format (GIF) image or an image in any other internet compatible image format, such as Joint Photographic Experts Group (JPEG) format or Portable Network Graphics (PNG) format. In the case of FIG. 20, the diagram portion 2006 is a class diagram from files named "Hello.java" and "MyThread.java," which contain the two classes, "Hello" and "MyThread," respectively. These two classes are represented in the UML class diagram by rectangular boxes labeled "Hello" and "MyThread." The class members of the classes are also listed within a rectangular box corresponding to each class. For example, in FIG. 20, the class member "attribute1," which is an attribute, and the class member "main," which is a method, are listed inside of the rectangular box corresponding to the class "Hello."

Textual portion 2008 is text-based documentation for the source code in the software project. Textual portion 2008 includes text that describes the classes, interfaces, constructors, methods, and fields in the source code of the software project. The description is formatted and organized in such a way as to make the source code easier to follow. Textual portion 2008 also includes a reproduction of comments inserted into the source code by programmers during development. For example, in FIG. 20, details regarding the "main" method of the class "Hello" are displayed. The details includes a heading entitled "Method Detail" that is set off by larger text and shading, the name of the method ("main"), the source code corresponding to the method ("static void main (String[] arg)"), and a comment inserted by a programmer into the source code during development ("This is the main routine to run this example.").

Figure 21:
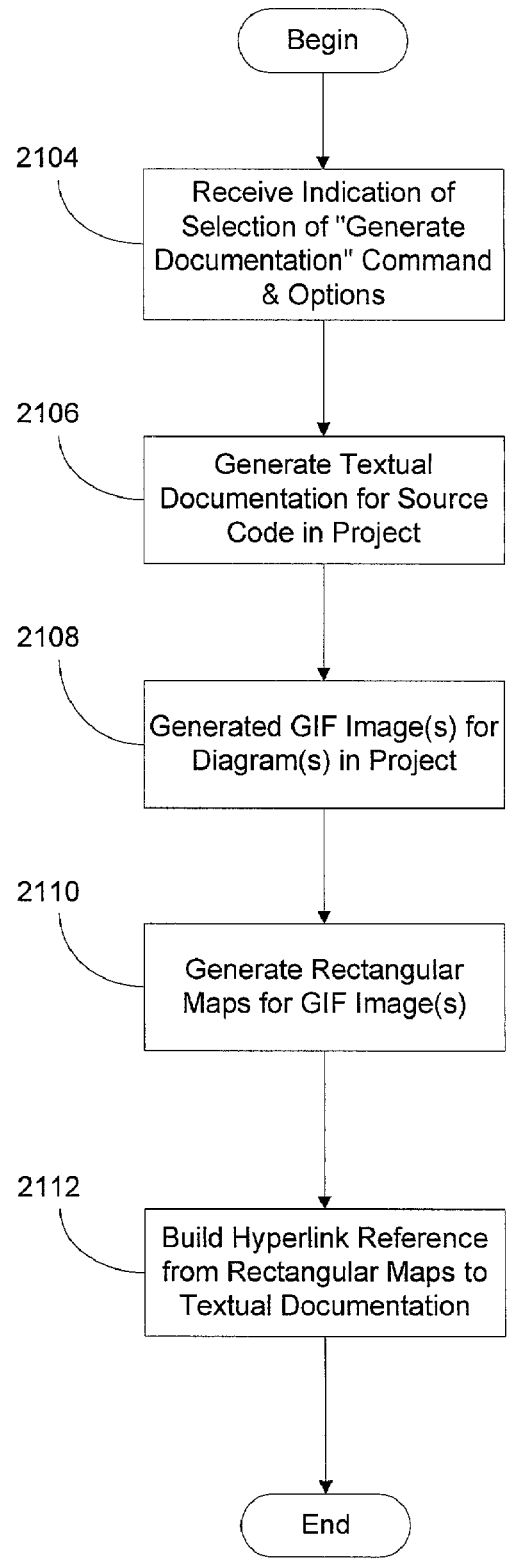
FIG. 21 depicts a flow diagram of exemplary steps performed by the software development tool depicted in FIG. 2 when generating documentation.
Figure 22:
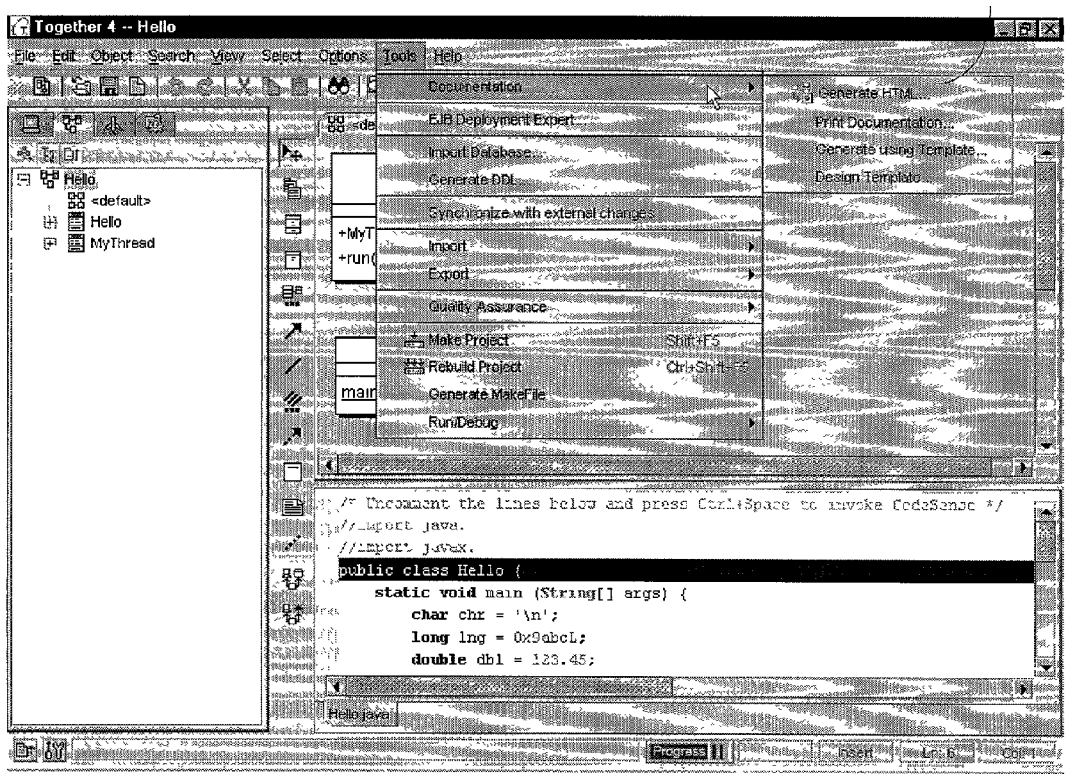
FIG. 22 depicts a user interface displayed by the software development tool depicted in FIG. 2, where the user interface displays a menu containing commands associated with documentation generation.
Figure 23:
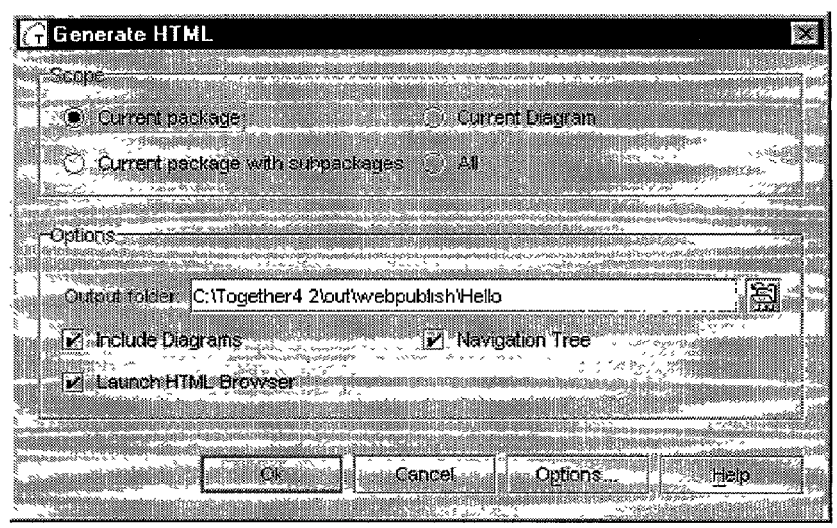
FIG. 23 depicts a user interface displayed by the software development tool depicted in FIG. 2.

A detailed description, with reference to the flow chart depicted in FIG. 21, will now be given of the manner in which the improved software development tool generates HTML documentation. The first step performed by the software development tool is to receive an indication of a selection of the "Generate Documentation" and various options associated with this command (step 2104). When a user wishes to generate HTML documentation for a software project, the user selects the "Generate Documentation" command from a pull down menu 2202 in the improved software development tool, like the one depicted in FIG. 22. This selection provides the improved software development tool with an indication of the selection of the "Generate Documentation" command. In response to the selection of the "Generate Documentation" command, the improved software development tool launches a dialog box 2302, like the one depicted in FIG. 23. The user then selects any desired options associated with the "Generate Documentation" command via dialog box 2302. For example, the user may choose to generate documentation for all of the files in the software project, for the current package, for the current package with subpackages, or for the current diagram, thus allowing the user to narrow the scope of the documentation output from a full project to a single drawing. The user may choose to launch the web browser immediately after documentation is generated. The user may choose to generate documentation that includes a diagram or a navigation tree. The user may also choose to store the documentation in a specific folder after it is generated. The improved software development tool thus receives an indication of the user's selection of the "Generate Documentation" command and of the user's selection of desired options.

The improved software development tool next generates the textual portion of the HTML documentation, (step 2106), by parsing the source code and the comments in the source code as described below. The result is a set of HTML pages describing the source code. One HTML file is generated for each source file.

FIGS. 24 and 25 illustrate an exemplary portion of source code written in the Java™ programming language and the textual documentation for that source code, respectively. The improved software development tool generates the textual portion of the HTML documentation depicted in FIG. 25 by searching the TMM, which has parsed the source code by dividing it into tokens, which are the individual elements that make up the programming language in which the source code is written. Tokens include, for example, such items as keywords, operators, and punctuation marks. For example, when the improved software development tool searches the TMM generated from the seventh line of source code and comments depicted in FIG. 24, it determines that a new class named "Hello" is declared, which has the characteristics of a public class in the Java™ programming language. The improved software development tool uses this information to produce the first two lines of HTML text in FIG. 25 that describe the class "Hello."

When searching the content of the TMM, the improved software development looks for informative portions such as names, comments, and parameters. For example, in FIG. 24, comments 2402 are lines of text inserted by a programmer during development to help explain the purpose and function of various portions of the source code. The comments in FIG. 24 to be included in the HTML documentation are tagged by the standard Javadoc™ symbols "/**" and "*/". In other words, the beginning of comments 2402 in FIG. 24 is tagged by the "/**" on the first line of code and the end is tagged by "*/" on the sixth line of code. The text in between these two symbols includes the text "This is the main routine to run this example," which is meant to give a simple explanation of the "main" routine, with which the comment is associated. These comments 2402 are associated with the "main" routine by being located just before that routine in the source code. Comments 2402 also include three parameters: "author," "version," and "see." Parameters are special fields within comments that may be selectively included in the HTML documentation. In the TMM generated from the source code depicted in FIG. 24, the parameters are tagged by the "@" symbol. The "author" parameter is used to designate the author of the source code that follows. In the case of FIG. 24, the "author" parameter recites the text "Together Developer." The "version" parameter is used to designate the specific version number for the source code that follows. In the case of FIG. 24, the "version" parameter recites the text "1.0." The "see" parameter is used to refer to other classes or class members that are related to or that should be referenced with regard to the class or class member associated with the "see" parameter. In the case of FIG. 24, the "see" parameter recites the text "MyThread," referring to the "MyThread" class.

The improved software development tool next generates GIF images for the diagrams in the software project, (step 2108), by extracting structural information out of the source code and applying that structural information to a set of well known UML diagram rules for the type of diagram being generated. For example, with regard to diagram element 2010 illustrated in FIG. 20, the software development tool determines that the statement "public class Hello" in the source code is declaring a class named "Hello." The improved software development tool applies this information to a layout algorithm (a well-known technique) corresponding to the set of UML diagram rules for the type of diagram being generated, in this case a class diagram, to generated a GIF image comprising a rectangular box labeled "Hello" with a list of the class members for the class "Hello" inside of the rectangular box.

The improved software development tool next generates an image map for the GIF images that it has generated (step 2110). The image map (a well-known HTML feature) is an image that contains one or more hyperlinks to other resources. Hyperlinks are a well-known feature of HTML that direct a web browser to connect from one HTML image or document to another HTML image or document. The improved software development tool generates the image map by partitioning the GIF images into areas that can be detected by a web browser. This enables the GIF images to be subsequently divided into individual rectangular regions that can be hyperlinked to portions of the textual documentation, as described further below in step 2112. For example, as illustrated in FIG. 20, by partitioning diagram 2006 into a grid of points, the improved software development tool is able to divide the individual images in diagram 2006 into rectangular regions, like rectangular area 2012, that can be correlated to a portion of the textual documentation, as describe below in step 2112.

The improved software development tool next generates hyperlink references from each of the rectangular regions mapped in step 2110 to corresponding portions of the textual documentation (step 2112). The hyperlink references are stored in a data structure (i.e., an organizational scheme such as a record or array, that can be applied to data to facilitate performing operations on it). With reference to FIG. 20, for example, the improved software development tool generates a hyperlink reference from rectangular area 2012 to the portion of textual documentation that corresponds to the "main" routine in the class "Hello." The information stored in the data structure for this example, would include the location and size of rectangular area 2012 (enabling a web browser to determine if an arrow for a pointing device, such as a mouse, is within the rectangular area) and the location of the beginning of the HTML textual documentation that corresponds to the "main" routine (a so-called "anchor" in well-known HTML terminology). So, for example, with reference to FIG. 20, a user may navigate to the exact part of the HTML textual documentation that describes the "main" routine by moving the mouse arrow inside of rectangular box 2012 and left clicking. The improved software development tool then automatically navigates to and displays the corresponding portion of the HTML textual documentation in the frame displaying the textual documentation.

While various embodiments of the present invention have been described, it will be apparent to those of ordinary skill in the art that many more embodiments and implementations are possible that are within the scope of this invention. Accordingly, the present invention is not to be restricted except in light of the attached claims and their equivalents.

What is claimed is:

1. A method in a data processing system for generating documentation for a source code file in a software project, the method comprising the steps of:

selecting a source code file from the project;

identifying the language of the source code;

generating a transient meta model for the source code;

determining whether the file is new, and if the file is new, adding symbols from the file to the transient meta model by, obtaining a template for the language, and parsing the source code with the symbols to the transient meta model;

determining whether the file is updated, and if the file is updated, updating the symbols from the file to the transient meta model by, obtaining a template for the language, and parsing the source code with the updated symbols to the transient meta model;

determining whether the file is deleted, and if the file is deleted, deleting symbols of the file from the transient meta model by, obtaining a template for the language, and parsing the source code with the symbols from the transient meta model;

generating a textual documentation that describes the source code, the textual documentation having portions that correspond to portions of the source code;

generating a diagram including at least one diagram element that visually represents the corresponding portion of the source code; and correlating the diagram elements to the corresponding portions of the textual documentation by providing hyperlinked references in the diagram that link diagram elements to the corresponding portions of the textual documentation.

2. The method of claim 1, wherein the step of generating a diagram comprises generating a graphics interchange format (GIF) image of each diagram element and generating an image map for an image of the diagram element images.

3. The method of claim 1, wherein the documentation is hypertext markup language (HTML) documentation displayable by a web browser.

4. The method of claim 1, wherein the links between the diagram portion and the text portion are hypertext markup language (HTML) links.

5. A data processing system for generating documentation for a source code file in a software project, comprising:
  means for selecting a source code file from the project;
  means for identifying the language of the source code;
  means for generating a transient meta model for the source code;
  means for determining whether the file is new, and if the file is new,
  means for adding symbols from the file to the transient meta model by,
  means for obtaining a template for the language, and
  means for parsing the source code with the symbols to the transient meta model;
  means for determining whether the file is updated, and if the file is updated,
  means for updating the symbols from the file to the transient meta model by,
  means for obtaining a template for the language, and
  means for parsing the source code with the updated symbols to the transient meta model;
  means for determining whether the file is deleted, and if the file is deleted,
  means for deleting symbols of the file from the transient meta model by,
  means for obtaining a template for the language, and
  means for parsing the source code with the symbols from the transient meta model;
  means for generating a textual documentation that describes the source code, the textual documentation having portions that correspond to portions of the source code;
  means for generating a diagram including at least one diagram elements that visually represents the corresponding portion of the source code; and
  means for correlating the diagram elements to the corresponding portions of the textual documentation by providing hyperlink references in the diagram that link diagram elements to the corresponding portions of the textual documentation.

6. The data processing system of claim 5, wherein the documentation is hypertext markup language (HTML) documentation displayable by a web browser.

7. The data processing system of claim 5, wherein the links between the diagram portion and the text portion are hypertext markup language (HTML) links.

8. A computer-readable storage medium containing instructions for controlling a data processing system to perform a method for generating documentation for source code in a software project, the method comprising the steps of:
  selecting a source code file from the project;
  identifying the language of the source code;
  generating a transient meta model for the source code;
  determining whether the file is new, and if the file is new,
  adding symbols from the file to the transient meta model by,
  obtaining a template for the language, and
  parsing the source code with the symbols to the transient meta model;
  determining whether the file is updated, and if the file is updated,
  updating the symbols from the file to the transient meta model by,
  obtaining a template for the language, and
  parsing the source code with the undated symbols to the transient meta model;
  determining whether the file is deleted, and if the file is deleted,
  deleting symbols of the file from the transient meta model by,
  obtaining a template for the language, and
  parsing the source code with the symbols from the transient meta model;
  generating a textual documentation that describes the source code, the textual documentation having portions that correspond to portions of the source code;
  generating a diagram including at least one diagram element that visually represents the corresponding portion of the source code; and
  correlating the diagram elements to the corresponding portions of the textual documentation by providing hyperlink references in the diagram that link diagram elements to the corresponding portions of the textual documentation.

9. The computer-readable storage medium of claim 8, wherein the step of generating a diagram comprises generating a graphics interchange format (GIF) image of each diagram element and generating an image map of the diagram element images.

10. The computer-readable storage medium of claim 8, wherein the documentation is hypertext markup language (HTML) documentation displayable by a web browser.

11. The computer-readable storage medium of claim 8, wherein the links between the diagram portion and the text portion are hypertext markup language (HTML) links.

12. A data processing system, comprising:
  a secondary storage device containing a software project, the software project comprising source code;
  a memory comprising a software development tool that selects a source code file from the project, identifies the language of the source code, generates a transient meta model for the source code, determines whether the file is new, and if the file is new, acids symbols from the file to the transient meta model by, obtaining a template for the language, and parsing the source code with the symbols to the transient meta model, and determines whether the file is updated, and if the file is updated, updates the symbols from the file to the transient meta model by, obtaining a template for the language, and parsing the source code with the updated symbols to the transient meta model, and determines whether the file is deleted, and if he file is deleted, deletes symbols of the file from the transient meta model by, obtaining a template for the language, and parsing the source code with the symbols from the transient meta model, and generates a documentation that describes the source code, the documentation including a diagram portion and a text portion and having hypertext markup language (HTML) links between the diagram portion and the text portion; and a processor for running the software development tool.

13. A method for generating a documentation for source code in a software project wherein the documentation includes a diagram portion and a text portion, the method comprising the steps of:

selecting a source code file from the project;

choosing to generate a documentation that describes the source code, the textual documentation having portions that correspond to portions of the source code;

selecting the desired options for the documentation;

identifying the language of the source code;

generating a transient meta model for the source code;

determining whether the file is new, and if the file is new, adding symbols from the file to the transient meta model by, obtaining a template for the language, and parsing the source code with the symbols to the transient meta model;

determining whether the file is undated, and if the file is update, updating the symbols from the file to the transient meta model by, obtaining a template for the language, and parsing the source code with the updated symbols to the transient meta model;

determining whether the file is deleted, and if the file is deleted, deleting symbols of the file from the transient meta model by, obtaining a template for the language, and parsing the source code with the symbols from the transient meta model;

generating the textual portion of the source code documentation;

generating images for diagram elements that correspond to portions of the textual documentation;

mapping the images into regions of the image map according to predefined diagram rules and options selected by the user; and generating hyperlink references from the regions of the image map of the diagram to the textual documentation.

14. The method of claim 13, wherein the step of generating textual documentation comprises generating hypertext markup language (HTML) documentation that is displayable by a web browser.

15. The method of claim 13, wherein the step of generating images comprises generating graphics interchange format (GIF) images that are displayable by a web browser.

16. The method of claim 13, wherein the step of mapping the images comprises mapping the images into rectangular regions.

* * * * *

UNITED STATES PATENT AND TRADEMARK OFFICE
CERTIFICATE OF CORRECTION

PATENT NO. : 7,114,149 B2
APPLICATION NO. : 09/838578
DATED : September 26, 2006
INVENTOR(S) : Aptus et al.

It is certified that error appears in the above-identified patent and that said Letters Patent is hereby corrected as shown below:

Column 26, Line 57 "acids" should be --adds--

Column 27, Line 26, "update" should be --updated--

Signed and Sealed this

Nineteenth Day of June, 2007

JON W. DUDAS
*Director of the United States Patent and Trademark Office*